US007962398B1

(12) United States Patent
Swearingen et al.

(10) Patent No.: US 7,962,398 B1
(45) Date of Patent: Jun. 14, 2011

(54) METHOD AND SYSTEM FOR EXECUTING TRADES IN A USER PREFERRED SECURITY

(75) Inventors: Bradley J. Swearingen, Round Rock, TX (US); David S. Harding, Austin, TX (US); Brant C. Lewis, Austin, TX (US); Richard Munoz, Jr., Cedar Park, TX (US); Gregory Scott Mogonye, Austin, TX (US); Gregory Ferris, Austin, TX (US); Philip R. Berber, Austin, TX (US)

(73) Assignee: Charles Schwab & Co., San Francisco, CA (US)

( * ) Notice: Subject to any disclaimer, the term of this patent is extended or adjusted under 35 U.S.C. 154(b) by 2028 days.

(21) Appl. No.: 09/663,151

(22) Filed: Sep. 15, 2000

(51) Int. Cl.
    *G06Q 40/00* (2006.01)
(52) U.S. Cl. ............................ 705/37; 705/35; 705/36 R
(58) Field of Classification Search ............... 705/35–37
    See application file for complete search history.

(56) References Cited

U.S. PATENT DOCUMENTS

| | | | |
|---|---|---|---|
| 4,334,270 A | 6/1982 | Towers | 364/300 |
| 4,346,442 A | 8/1982 | Musmanno | 364/408 |
| 4,376,978 A | 3/1983 | Musmanno | 364/408 |
| 4,597,046 A | 6/1986 | Musmanno et al. | 364/408 |
| 4,774,663 A | 9/1988 | Musmanno et al. | 364/408 |
| 4,885,685 A | 12/1989 | Wolfberg et al. | 364/401 |
| 4,910,676 A | 3/1990 | Alldredge | 364/408 |
| 4,989,141 A | 1/1991 | Lyons et al. | 364/408 |
| 5,220,500 A | 6/1993 | Baird et al. | 364/408 |
| 5,222,019 A | 6/1993 | Yoshino et al. | 364/408 |
| 5,414,838 A * | 5/1995 | Kolton et al. | 705/36 R |
| 5,454,104 A | 9/1995 | Steidlmayer et al. | 395/600 |
| 5,523,942 A | 6/1996 | Tyler et al. | 364/401 |
| 5,692,233 A | 11/1997 | Garman | 705/36 |
| 5,774,878 A * | 6/1998 | Marshall | 705/35 |
| 5,835,087 A * | 11/1998 | Herz et al. | 715/810 |
| 5,864,827 A | 1/1999 | Wilson | 705/35 |
| 6,073,115 A * | 6/2000 | Marshall | 705/35 |

(Continued)

FOREIGN PATENT DOCUMENTS

WO    WO 96/06402    2/1996

OTHER PUBLICATIONS

Barra, Inc. Press Release entitled "Barra Provides Combined Style Analysis and Asset Allocation Capabilities," Sep. 4, 1996.

(Continued)

*Primary Examiner* — Narayanswamy Subramanian
(74) *Attorney, Agent, or Firm* — Kilpatrick Townsend & Stockton LLP

(57) ABSTRACT

A system for executing trades in a user preferred security comprising a server system (12) in communication with a client system (14), a security data source (26) and a trade execution location (30). The security data source (26) provides security data relating to a plurality of securities to the server system (12). The server system (12) analyzes the security data based upon M user specific criteria, and identifies user preferred securities from the plurality of securities and provides the client system (14) with data relating to the user preferred securities. The client system (14) uses N user specific parameters to generate and display an N dimensional graph that is populated with icons representing the user preferred securities. After a user preferred security is selected, the server system (12) routes the order to a trade execution location (30).

32 Claims, 19 Drawing Sheets

U.S. PATENT DOCUMENTS

| | | | | |
|---|---|---|---|---|
| 6,161,098 | A * | 12/2000 | Wallman | 705/36 T |
| 6,278,982 | B1 * | 8/2001 | Korhammer et al. | 705/37 |
| 6,317,726 | B1 * | 11/2001 | O'Shaughnessy | 705/36 R |
| 6,826,552 | B1 * | 11/2004 | Grosser et al. | 706/47 |
| 6,839,686 | B1 * | 1/2005 | Galant | 705/36 R |
| 7,043,449 | B1 * | 5/2006 | Li et al. | 705/36 R |
| 7,167,838 | B1 * | 1/2007 | Gatto | 705/36 R |
| 7,177,831 | B1 * | 2/2007 | O'Shaughnessy et al. | 705/36 R |
| 7,246,092 | B1 * | 7/2007 | Peterson et al. | 705/37 |
| 7,308,428 | B1 * | 12/2007 | Federspiel et al. | 705/36 R |
| 7,620,587 | B2 * | 11/2009 | Duquette | 705/37 |
| 7,797,226 | B2 * | 9/2010 | Ram et al. | 705/37 |
| 7,870,059 | B2 * | 1/2011 | Shapiro et al. | 705/37 |
| 2002/0059294 | A1 * | 5/2002 | Bottarelli et al. | 707/104.1 |
| 2002/0133449 | A1 * | 9/2002 | Segal et al. | 705/37 |
| 2003/0004853 | A1 * | 1/2003 | Ram et al. | 705/37 |
| 2003/0009411 | A1 * | 1/2003 | Ram et al. | 705/37 |
| 2003/0093343 | A1 * | 5/2003 | Huttenlocher et al. | 705/35 |
| 2003/0154157 | A1 * | 8/2003 | Kokis et al. | 705/37 |
| 2005/0228735 | A1 * | 10/2005 | Duquette | 705/37 |
| 2005/0273424 | A1 * | 12/2005 | Silverman et al. | 705/39 |
| 2006/0259394 | A1 * | 11/2006 | Cushing et al. | 705/37 |
| 2006/0265320 | A1 * | 11/2006 | Duquette | 705/37 |
| 2007/0005481 | A1 * | 1/2007 | Kedia et al. | 705/37 |
| 2007/0162365 | A1 * | 7/2007 | Weinreb | 705/35 |
| 2008/0183639 | A1 * | 7/2008 | DiSalvo | 705/36 R |
| 2009/0204548 | A1 * | 8/2009 | Swearingen et al. | 705/36 R |
| 2009/0292651 | A1 * | 11/2009 | Duquette | 705/36 R |
| 2010/0125534 | A1 * | 5/2010 | Brandes et al. | 705/36 R |
| 2010/0287114 | A1 * | 11/2010 | Bartko et al. | 705/36 R |
| 2010/0332379 | A1 * | 12/2010 | Ram et al. | 705/37 |

OTHER PUBLICATIONS

"Do You Know Your Left from Your Right?" *Interface*. 2nd Quarter 1998, vol. 5, Issue 2.

Fersko-Weiss, Henry. "Dialing for Profits," *Personal Computing*. p. 180, vol. 10, No. 5, May 1986.

Ibbotson Associates' Sales Brochure. Apr. 1998.

* cited by examiner

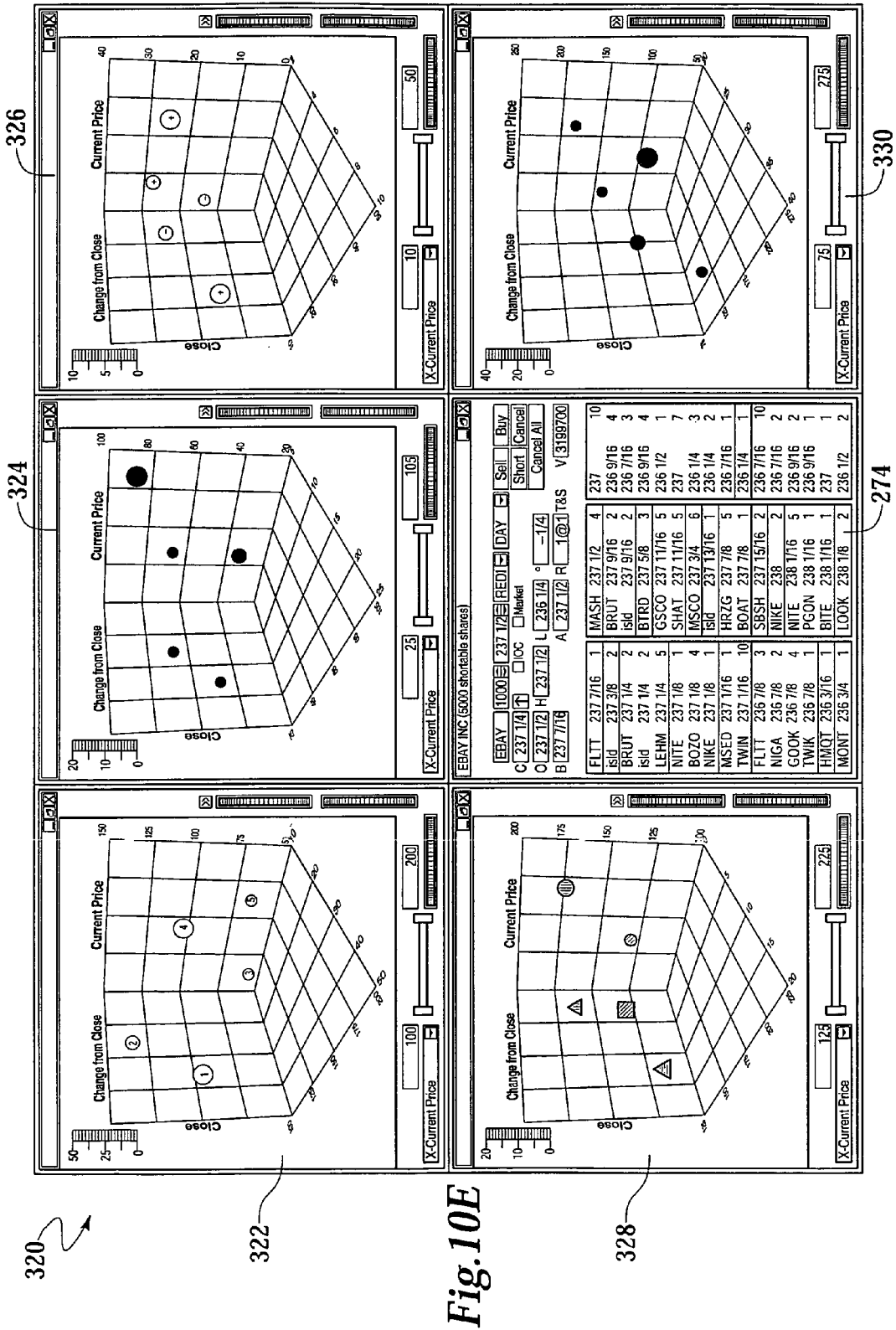

METHOD AND SYSTEM FOR EXECUTING TRADES IN A USER PREFERRED SECURITY

TECHNICAL FIELD OF THE INVENTION

This invention relates in general to a computer method and system for executing security trades and, in particular, to a computer method and system for the execution of security trades in user preferred securities displayed in a multi-dimensional graph.

BACKGROUND OF THE INVENTION

Without limiting the scope of the present invention, its background will be described with regard to trading common stock, as an example.

In trading common stock, there are three fundamental factors an investor must consider. These factors are what stock to trade, when to open a position in the stock and when to close that position in the stock. There are enumerable models that attempt to help the investor identify these factors each of which are based upon particular criteria. Some of the models are best suited for the long term investor using a buy and hold approach. Other models are better suited for the short term investor including, for example, the active investors that open and close positions in the same day or week.

In determining what stock to trade, a typical long term investor may perform substantial research into a particular company in an effort to evaluate the future success of that company. For example, a long term investor may evaluate whether the company has products or services that are likely to have an increase in sales, the effectiveness of a company's research and development, the profit margin of the company, the size and effectiveness of the company's sales organization, labor relations within the company, the quality of management personnel at the company, the competitiveness of the company in relation to other companies in the industry and long range outlook for profits.

In addition to these business related factors, the long term investor may look at factors such as whether the company typically pays dividends on common stock, the price to earnings ratio of the stock and the market capitalization of the company as well as earnings, revenue and net income of the company. On the other hand, an investor that is interested in short term investments may not perform such detailed research and instead may focus on factors such as volume of trades, proximity to a milestone such as a fifty two week high, difference between current volume and a historical volume, number of daily highs or money flow in identifying a stock of interest.

Once an investor has identified a stock of interest, the investor must then determine when to open a position in that stock. A long term investor might, for example, buy the stock regardless of price if it is being offered by a good company in a good industry banking on long term growth. Alternatively, a long term investor may monitor factors such as business cycles, the trend of interest rates, governmental attitudes and the direction of inflation in making such a decision. The short term investor, however, may be more interested in such factors as the volatility of the stock or the liquidity of the stock in making such a decision.

The next step for an investor once they have opened a position in a stock is to determine when to close that position. A long term investor may, for example, make a decision to sell a stock based upon factors such as a fundamental change in a company that does not comport with the investor's original criteria for buying stock in that company, a change in management in the company, under performance of the stock, the stock reaching an unacceptable low, a belief that the stock has peaked or simply a belief that another investment has better long term prospects. While some of these factors may also be important to a short term investor, a short term investor may focus more heavily on such factors as the continued momentum of the stock or simply making certain all open positions are closed by the end of a day.

Regardless of the investment strategies, however, these three factors, what to stock to trade, when to open a position in that stock and when to close the position in that stock remain key elements in any successful investment strategy. Therefore, a need has arisen for a system and method for identifying stocks that meet specific criteria selected by the investor. A need has also arisen for such a system and method that allows the investor to execute trades in those stocks that meet the investor's criteria.

SUMMARY OF THE INVENTION

The present invention disclosed herein comprises a computer based system and method for executing trades in user preferred securities. The system and method enable an investor to identify securities that meet specific criteria then enable the investor to execute trades in the identified securities.

The computer based system and method of the present invention utilize a computer program embodied on a computer readable medium on a client system and a computer program embodied on a computer readable medium on a server system. The client system and the server system are in communication with one another using known communication means. The server system is also in communication with a plurality of security data sources and a plurality of trade execution locations.

The security data sources provide the server system with security data relating to a plurality of securities. The client system provides the server system with user specific criteria that the server system uses to analyze the security data and to identify the securities that meet the user specific criteria. Once these user preferred securities are identified by the server system, information relating to the user preferred securities is transmitted to the client system.

In the client system, the user preferred securities are represented in an N dimensional graph based upon N user specific parameters selected by the user. For example, the user preferred securities may be displayed in a graph having at least three dimensions, at least five dimensions or more depending upon the number of user specific parameters selected by the user. The user may then select one of the user preferred securities from the N dimensional graph and associate order parameters with the selected user preferred security. The order parameters may include the number of shares, the price per share and an execution method desired by the user. An order to trade the selected user preferred security may then be sent from the client system to a server system the order being, for example, a buy order, a sell order, a short order or a cancel order. In the server system, the order is processed, including for example performing compliance analysis, then the order is routed to one of the trade execution locations where the trade is executed. Information regarding the order and the execution of the trade may be stored in a database of the server system.

BRIEF DESCRIPTION OF THE DRAWINGS

For a more complete understanding of the present invention, including its features and advantages, reference is now made to the detailed description of the invention, taken in conjunction with the accompanying drawings of which:

FIGS. 10A-10E are screen diagrams of multi-dimensional graphs for identifying user preferred securities including graphical user interfaces for trade execution of a system for executing trades in user preferred securities of the present invention.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
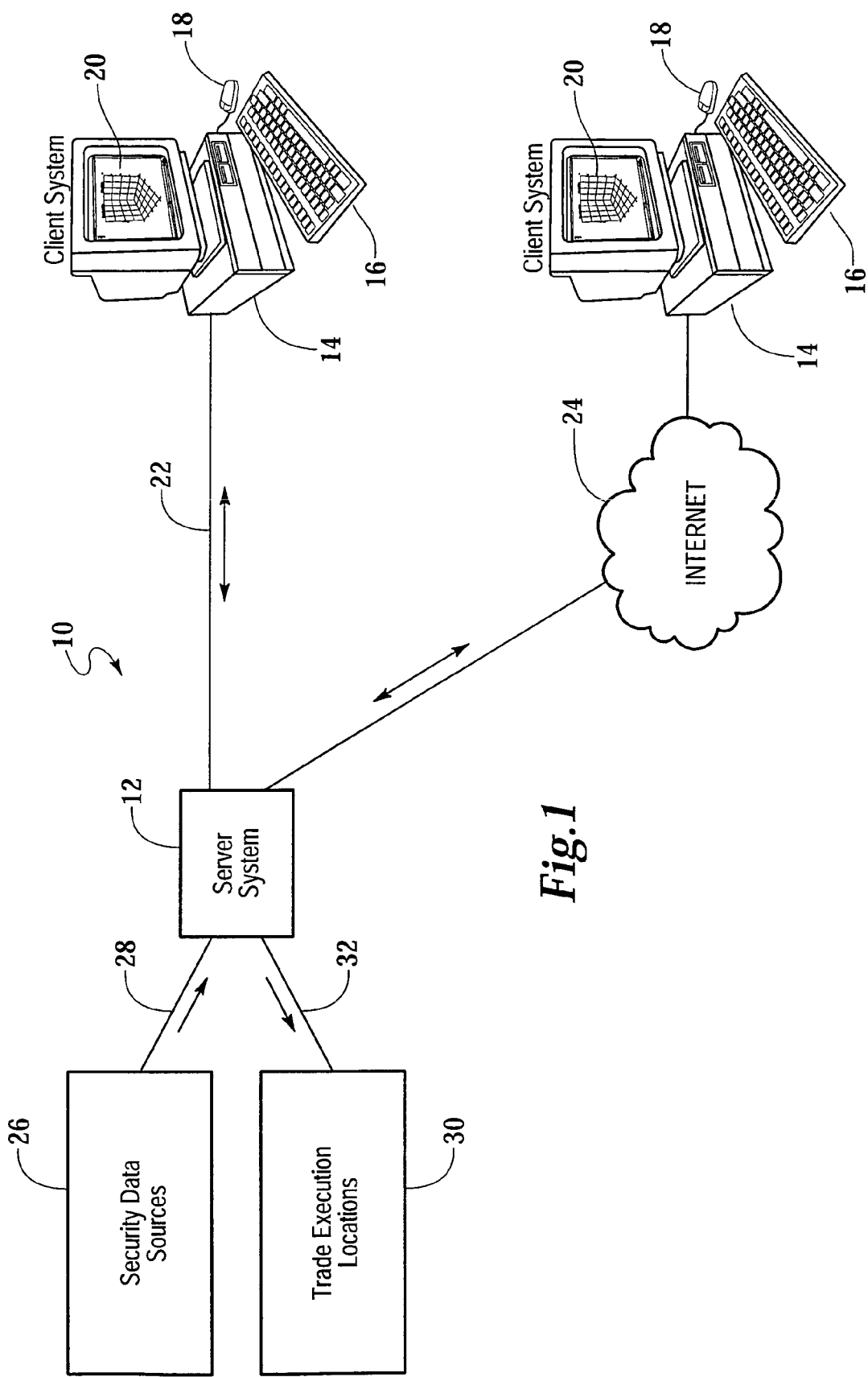
FIG. 1 is a platform diagram of a system for executing trades in user preferred securities of the present invention.

Referring now to FIG. 1, therein is depicted a platform layout of the system for executing trades in user preferred securities of the present invention that is generally designated 10. System 10 includes a server system 12 and a pair of client systems 14. Client systems 14 may include any number of peripheral input, storage and display devices such as a keyboard 16, a mouse 18 and a monitor 20. Server system 12 may communicate with client system 14 by any suitable means. In one illustrated embodiment, server system 12 is in communication with a client system 14 via a direct connection 22 such as a T1 line, a frame, a dial up modem or the like. In the other illustrated embodiment, server system 12 is in communication with the other client system 14 via an internet connection 24.

Server system 12 is also in communication with one or more security data sources 26 via a T1 line, a high speed modem or other transmission line 28 using, for example, a direct socket connection such as a TCP/IP connection. Security data sources 26 provide data feeds to server system 12 from a plurality of sources such as PC Quote, S&P Comstock, NQDS and the like that contain all types of information relating to thousands of securities that are traded, for example, on the New York Stock Exchange (NYSE), NASDAQ, Electronic Communications Networks (ECN) and the like. The data feeds contain a variety of information relating to each security. For example, the data feeds may contain level one information, which is best ask and best bid information as well as time and sales information, and level two information which includes detailed market participant information. In addition, the data feeds may include fundamental information such as market capitalization, sector information, price to earning ratio, 52 week highs and lows and the like.

Server system 12 includes an application programming interface that takes each data feed from the various security data sources 26, which are typically in a proprietary format, and processes it for real-time dissemination to client systems 14. As the amount of information received and processed by server system 12 from security data sources 26 is voluminous, each client system 14 typically receives only the information that the user of that client system 14 requests. As such, each client system 14 requests and receives only a small subset of the information processed by server system 12. For example, one user may be interested in securities that are approaching a 52-week high and that have a five day average volume above a particular threshold. In this case, the user would make the appropriate request from a client system 14 to the server system 12 for processing. The server system 12 then returns only the information relating to the securities that meet this user's criteria to that client system 14. Likewise, another user may be interested in securities having a high current volume that fall within a particular price range. Again, in this case, the user would make the appropriate request from a client system 14 to server system 12 which would return only the information relating to the securities that meet this user's criteria to that client system 14.

Server system 12 is also in communication with one or more trade execution locations 30 via a T1 line, a high speed modem or other transmission line 32 using, for example, a direct socket connection such as a TCP/IP connection. Trade execution locations 30 include the various market participants, such as, exchanges, market makers, ECNs and the like. Server system 12 receives orders from client systems 14. The orders are processed in server system 12 and routed to the appropriate trade execution location 30 where the orders may be filled.

More specifically, server system 12 includes an application programming interface that takes each order from the client systems 14 and places that order in the required format, which is typically a proprietary format, depending upon which trade execution location 30 is to receive the order. The specific trade execution location 30 to which server system 12 sends a particular order is determined by a number of factors. For example, the user of the client system 14 originating the order may request a particular execution method such as execution at a specific trade execution location 30 or a specific type of trade execution location 30. Similarly, the particular type of order place by the user of the client system 14 may dictate that the order be sent to a specific trade execution location 30. Alternatively, server system 12 may select a particular trade execution location 30 to send an order to based upon factors such as the liquidity of the security at a particular trade execution location 30, the speed at which a particular trade execution location 30 fills order, the ratio of orders filled at a particular trade execution location 30 and the like.

Figure 2:
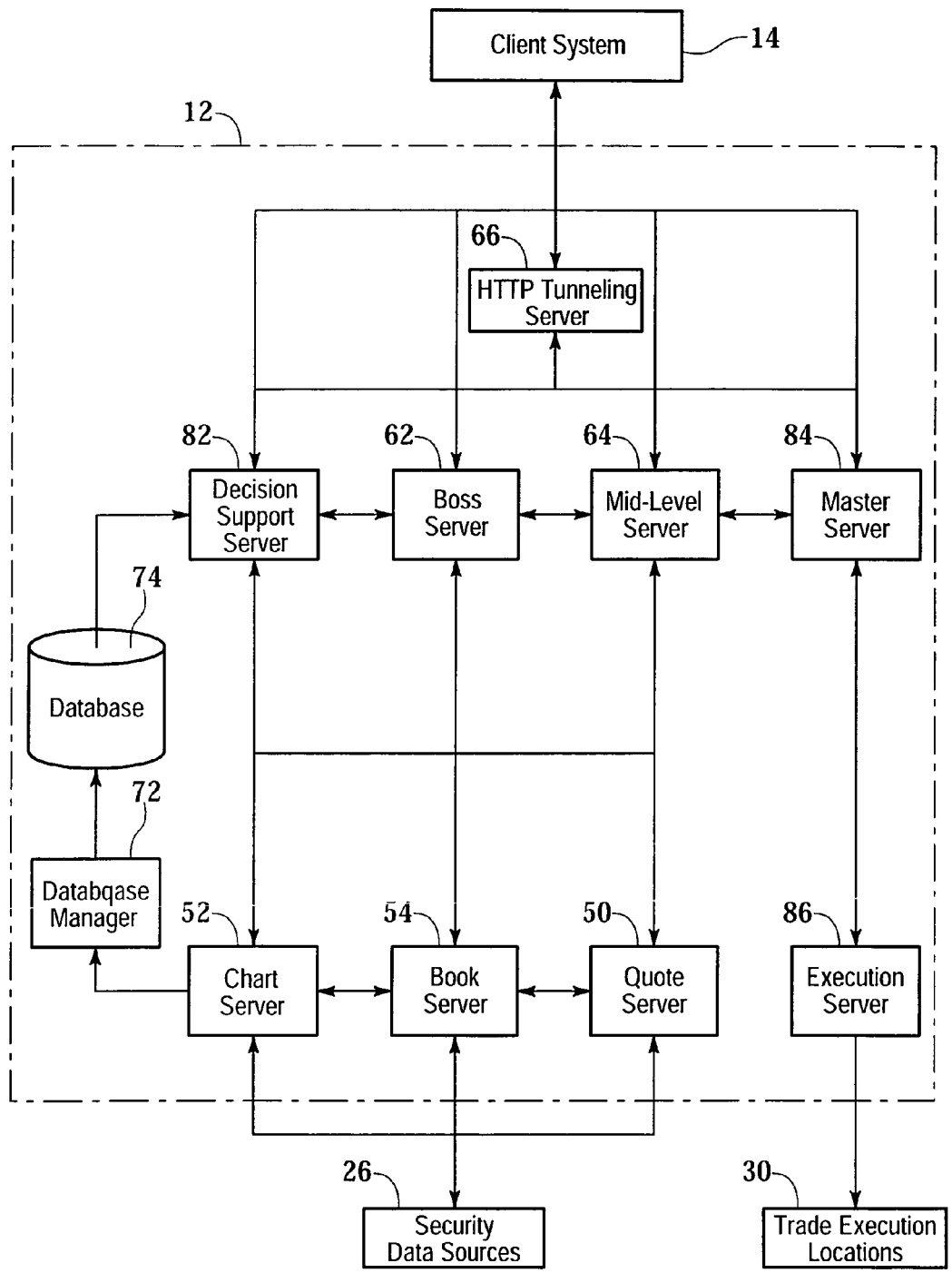
FIG. 2 is a block diagram of a server system of a system for executing trades in user preferred securities of the present invention.

Referring now to FIG. 2, therein is depicted a more detailed diagram of server system 12 of the system for executing trades in user preferred securities. Server system comprises numerous integrated servers that enable the processing of security data received from security data sources 26 for dissemination to various, client systems 14 based upon the request made from each client system 14 and that enable the user of client systems 14 to execute trades at the various trade execution locations 30.

Server system 12 includes a quote server 50, a chart server 52 and book servers 54. Quote server 50 receives the data feed from one of the security data sources 26 and parses the data based upon the feed parsing API. The parsed information may be sent via direct connection to a client system 14 upon request by a client system 14. In the illustrated embodiment, however, the connection between quote server 50 and client system 14 include a boss server 62, a mid-level server 64 and an HTTP tunneling server 66 as will be explained in more detail below. As such, quote server 50 may disseminate real-time first level security data, real-time second level security data and the like to client system 14. For speed of delivery to client systems 14, some of this data preferably resides in the cache memory of quote server 50 or may alternatively reside in RAM.

Chart server 52 receives the data feed from one of the security data sources 26 and parses the data based upon the feed parsing API. The parsed information is further processed by database manager 72 such that information relating to the securities may be stored in database 74. Database 74 is used for historical charting of security data. For example, database 74 builds one, two, three and five minute charts for intraday activity as well as historical charts for daily volume, daily highs and lows and the like for specified time increments such as the prior week, month or year. Database 74 is preferably an in-memory database utilizing cache memory and RAM such that information requested by a client system 14 can be disseminated as fast as possible.

Book server 54 receives the data feed from one of the security data sources 26 and parses that data based upon the feed parsing API. More specifically, book server 54 receives data from an ECN. The ECN data feeds contain not only the first and second level security data but also information relating to all the available asks and bids of each security.

Mid-level server 64 monitors information on a subset of the securities on which data feeds are received. While quote server 50, chart server 52 and book server 54 monitor all securities, perhaps 12,000 to 15,000 or more, mid-level server 64 only monitors those securities that are frequently requested by a client system 14, perhaps several hundred to a few thousand. For example, mid-level server 64 monitors all open positions that users presently have as well as additional securities that are being watched by such users, i.e., those that are part of real-time user requests and historically active securities. Use of mid-level server 64 adds flexibility to server system 12 by reducing the load on the other servers. In addition, the use of mid-level server 64 enhances the speed at which information is disseminated to client systems 14 by, among other things, gathering, combining and placing in cache memory data from quote server 50, chart server 52 and book server 54 such that a request from a client system 14 does not have to be processed by more than one server.

It should be understood by those skilled in the art that the use of the term server herein may mean a single physical server, multiple physical servers or multiple instances of an execution on a single physical server. For example, it is preferable to have multiple quote servers, at least one for each exchange and multiple book servers, at least one for each ECN. Likewise, it is preferable to have multiple chart servers and multiple mid-level servers depending upon the amount of information being processed. Also, it should be understood by those skilled in the art that the servers described herein that make up server system 12 may comprise any suitable processor. For example, a Dell dual 500 MHZ processor with 512 MB of memory operating on a Microsoft Windows NT 4.0 platform has been found to be suitable.

In addition to the above described servers, server system 12 may include a boss server 62 that manages the operation of the other servers. Boss server 62 optimizes the processing of server system 12 by routing connection requests from client systems 14 to the servers within server system 12, for example to a specific mid-level server 64, that are presently operating with appropriate capacity to handle the new connection which avoids overloading any of the servers.

For connection between server system 12 and client systems 14 over the internet, server system 12 may also includes HTTP tunneling server 66. HTTP tunneling server 66 allows client systems 14 to work through fire walls, proxy servers and the like.

Server system 12 includes a decision support server 82. As with the mid-level server 64, decision support server 82 performs specific tasks which enable server system 12 to be more responsive to client systems 14. Decision support server 82 provides the data feed to client systems 14 that enables the creation of a multi-dimensional graph on the client systems 14 that allows for the graphical display of user preferred securities. In the illustrated embodiment, decision support server 82 receives data feeds from chart server 52, book servers 54 and quote server 50. In addition, decision support server 82 receives a data feed from data compiled in database 74. As explained in more detail below, decision support server 82 receives queries that contain various criteria from users of a client system 14 which are processed by decision support server 82 to identify particular securities that are of interest to users of a client system 14. The criteria range from fundamental information such as the market cap, dividends, 52 week highs and lows to technical analysis including Bollinger bands, RSI, moving averages, money flow, and other charting techniques. More specifically, but by way of example only, the following is a list of some the criteria that may be utilized by decision support server 82:

Current Price—Current market price;

Volume—Number of shares placed in the market that day;

High/Low—Highest/Lowest price a security has reached that day;

Open/Close—Price at the most recent open/close;

Daily High/Low Count—Number of times a new High/Low has been reached that day;

52 Week High/Low—Highest/Lowest price a security has reached in the past 52 weeks;

Gap—Difference between most recent close and open prices expressed as a dollar value or as a percentage;

Change from Close/Open—Change in the price from the Close/Open expressed as a dollar value or as a percentage;

Change from X Day/Month/YTD Avg Close—Difference between the average close for the last X days/months/YTD and the Current Price expressed as a dollar value or as a percentage;

X Day/Month/YTD Avg Volume—Average of the volume over the last X days/months/YTD;

Volume Over Yesterday's Vol (%)—Difference between current Volume and yesterday's volume expressed as a percentage;

Volume Over 5 Day Avg Vol (%)—Difference between current Volume and the average volume for the last five days, expressed as a percentage;

X Day/Month/YTD High/Low—Highest/Lowest price a security has reached over the last X days/months/YTD, including today;

15/60/120 Day SMA—Average of the last 15, 60 or 120 days' close values, including today;

15/60/120 Day EMA—While similar to the SMA above, the exponential moving average uses a "smoothing factor" to give more weight to recent prices, while still allowing all data in the window to influence the average;

Rate of Change—Change in price between the current price and the close 6 days ago, divided by the price 6 days ago;

10/30/50 Day RSI—Relative Strength Index indicates the degree of positive and negative movement by the stock on a scale of 0 (weakest) to 100 (strongest). Determined by figuring the ratio of the average up closes for the last 9, 29 or 49 days (using today's Current Price for the 10th, 30th or 50th day) divided by the sum of the average up closes and the average down closes for the same period. This ratio is multiplied by 100;

10/30/50 Day RSI from Close—Relative Strength Index indicates the degree of positive and negative movement by the stock on a scale of 0 (weakest) to 100 (strongest). Determined by figuring the ratio of the average up closes for the last 10, 30 or 50 days (not including today if prior to close) divided by the sum of the average up closes and the average down closes for the same period. This ratio is multiplied by 100;

Bollinger Bands—The center is an n-interval exponential moving average. The top and bottom lines are placed in standard deviations above and below the centerline. Since standard deviations are a measure of volatility, the bands widen during volatile price action and contract when the trading range tightens;

MACD—Trend-following momentum indicator that uses three exponential moving averages: a short or fast average, a long or slow average and an exponential average of their difference, the last being used as a signal or trigger line;

OBV (On Balance Volume)—Indicator that relates volume to price changes by adding volume to a running total when the price closes up for a period and subtracts the volume if the stock closes down for a period;

20/40/60 Day Momentum—Measures the amount that a security's price has changed over the last 20, 40 or 60 days. If today hasn't closed yet, it uses the current price for today's close;

20/40/60 Day Momentum from Close—Measures the amount that a security's price has changed over the last 20, 40 or 60 closes;

Money Flow—Indicates with a dollar value whether money is flowing into or out of a security. Calculated by subtracting the downtick and adding the uptick for every tick of the trading day;

Money Flow (%)—Indicates the percentage at which money is flowing into or out of a security;

Williams % R—Measures the percentage to which a security is overbought or oversold based on the position of the current period's close to the range of prices over a time period;

PE Ratio—Measures how expensive a security is based upon the cost an investor in a security must pay per dollar of current annual earnings;

EPS Ratio—Net income divided by the number of shares of a company participating in the profits;

Dividend—Taxable payment declared by a company's board of directors and given to its shareholders out of the company's current or retained earnings;

Market Cap—Market value of all of a company's outstanding shares;

PS Ratio—A security's capitalization divided by its sales over the previous 12 months;

Earnings—Revenues minus cost of sales, operating expenses, and taxes, over a given period of time;

Net Income—Gross sales minus taxes, interest, depreciation, and other expenses;

Revenue—Total dollar amount collected for goods and services provided;

DPS Ratio—Dividends Per Share Ratio indicates the dollar amount of dividends issued to stockholders per share;

Shares Outstanding—Shows number of shares of a corporation which have been issued;

Stock Exchange—Shows the exchange (NYSE, NASDAQ, etc.) on which a security trades;

Sector—Shows the general industry classification of the company; and

Industry—A specific category describing the company's business activity.

Server system 12 also includes a master server 84 and an execution server 86. Client systems 14 may connect directly to master server 84 or may connect through HTTP tunneling server 66. In either case, once a user from a client system 14 connects to master server 84, master server 84 loads information relating to that user into memory from a client database (not pictured). Master server 84 monitors orders from client system 14 and performs compliance checks on the orders. For example, master server 84 would reject an order from client system 14 if the user attempts a trade that exceeds the user's buying power. Likewise, master server 84 would disallow an order from client system 14 that would be in violation of securities regulations such as an order that would be in violation of the Soes five minute rule.

Execution server 86 receives the orders from master server 84. Execution server 86 then routes the orders to a trade execution location 30 based upon the particular execution method requested by the user, such as execution at a specific trade execution location 30 or a specific type of trade execution location 30. Alternatively, execution server 86 may select a particular trade execution location 30 based upon factors such as the liquidity of the security at a particular trade execution location 30, the speed at which a particular trade execution location 30 fills orders, the ratio of orders filled at a particular trade execution location 30 and the like. Once the trade execution location 30 is selected, the order is formatted for the proprietary application programming interface of that trade execution location 30. The order is then sent to that trade execution location 30 to be filled.

Figure 3:
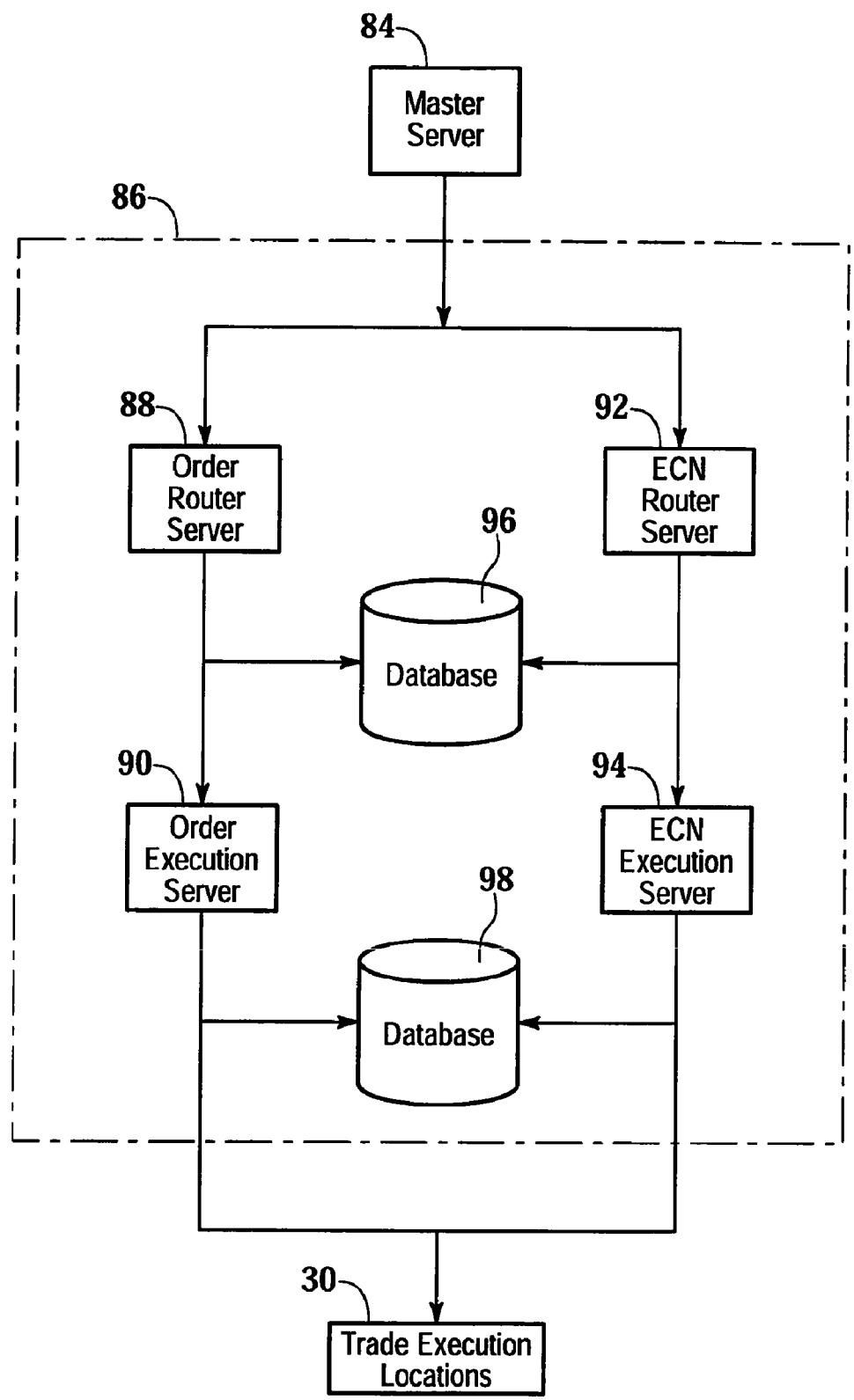
FIG. 3 is a block diagram of an execution server of a system for executing trades in user preferred securities of the present invention.

Referring now to FIG. 3, therein is depicted a more detailed diagram of the servers that comprise execution server 86 of the system for executing trades in user preferred securities of the present invention. As explained above, client systems 14 send orders to master server 84 wherein the orders are processed and compliance checks are performed. Master server 84 sends the orders, which satisfy the compliance checks, to execution server 86. Execution server 86 includes an order router server 88, an order execution server 90, an ECN router server 92 and an ECN execution server 94. The order will be sent to either the order router server 88 or the ECN router server 92 depending upon the execution method selected by the user of client system 14 or by server system 12. For example, if the execution method selected by the user of client system 14 is to trade on NASDAQ via Soes, master server 84 will send the order to order router server 88 which will route the order to order execution server 90 where the order is formatted for the application programming interface for a Soes trade. The order is then sent to Soes for an automated trade based upon the Soes trading methodology. In a similar manner, if the execution method selected by the user of client system 14 is to trade on the NYSE, master server 84 will send the order to order router server 88 which will route the order to order execution server 90 where the order is formatted and forwarded to the floor of the NYSE for a manual trade.

Alternatively, if the execution method selected by the user of client system 14 is to trade on an ECN, such as the trade execution location 30 of Isld, master server 84 will send the order to ECN router server 92 which will route the order to ECN execution server 94 where the order is formatted for the application programming interface for a trade on Isld. The order is then sent to Isld for an automated trade. Similarly, the user of client system 14 may elect to trade on any one of the other ECNs such as the trade execution location 30 of Inca, Arca, Redi, Attn, Btrd, Strk, Ntrd, Brut, Market XT and the like.

Execution server 86 also includes databases 96, 98. Database 96 receives and stores all of the information relating to the orders routed by order router server 88 and ECN routers server 92. Likewise, database 98 receives and stores all of the information relating to the orders sent to trade execution locations 30 by order execution server 90 and ECN execution server 94 and information received from trade execution locations 30.

Figure 4:
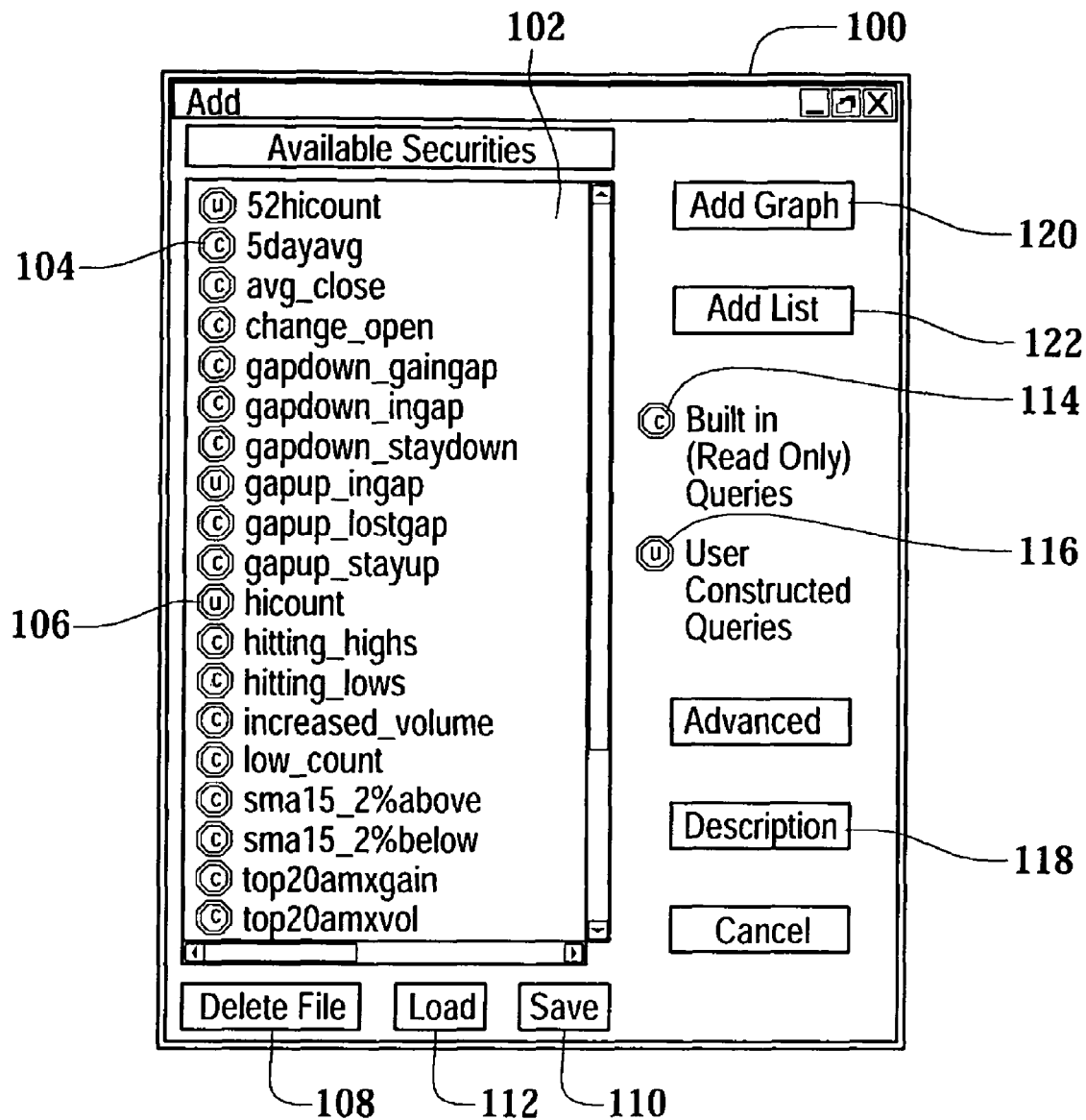
FIG. 4 is a graphical user interface for selecting user specific criteria of a system for executing trades in user preferred securities of the present invention.

A user of the system for executing trades in user preferred securities of the present invention interfaces with server system 12 using a client system 14. Specifically, the user of a client system 14 makes a request on decision support server 82 based upon one or more of the above described criteria. The user may select any number of criteria which will be referred to herein as M user specific criteria. Decision support server 82 then identifies the securities that meet these M user specific criteria which are referred to herein as user preferred securities. As best seen in FIG. 4, the user of client system 14 opens an Add query window 100 which allows the user to select from built-in and user constructed preloaded queries or allows the user to construct new queries. These queries define the M user specific criteria used to select the user preferred securities. More specifically, Add query window 100 includes an available queries selection box 102 that shows a list of available queries. The built-in queries are indicated by a "c" icon, such as 5 dayavg query 104. The user constructed queries are indicated by a "u" icon, such as hicount query 106.

Add query window 100 also includes Delete File button 108 that allows a user to delete user constructed queries, a Save button 110 that allows the user to save user constructed queries or query lists and a Load button 112 that allows the user to access a saved query list. Add query window 100 allows the user to display or hide built-in, user constructed queries or both by operating a Built-in query button 114 and a User constructed queries button 116. By selecting a particular query and pushing Description button 118, the detailed search criteria of the selected query is provided to the user. For example, if the user selected hicount query 106 and requested a description, a description dialog box would appear having a description such as "top 20 stocks hitting daily highs today."

Add query window 100 allows the user to construct a multi-dimensional graph that displays the user preferred securities that are identified as a result of the user specific criteria in the selected query. By pressing the Add Graph button 120, the user preferred securities are graphically represented to the user on client system 14 as will be explained in more detail below. Alternatively or additionally, the user may view the user preferred securities in a list format by pressing the Add List button 122.

Figure 5:
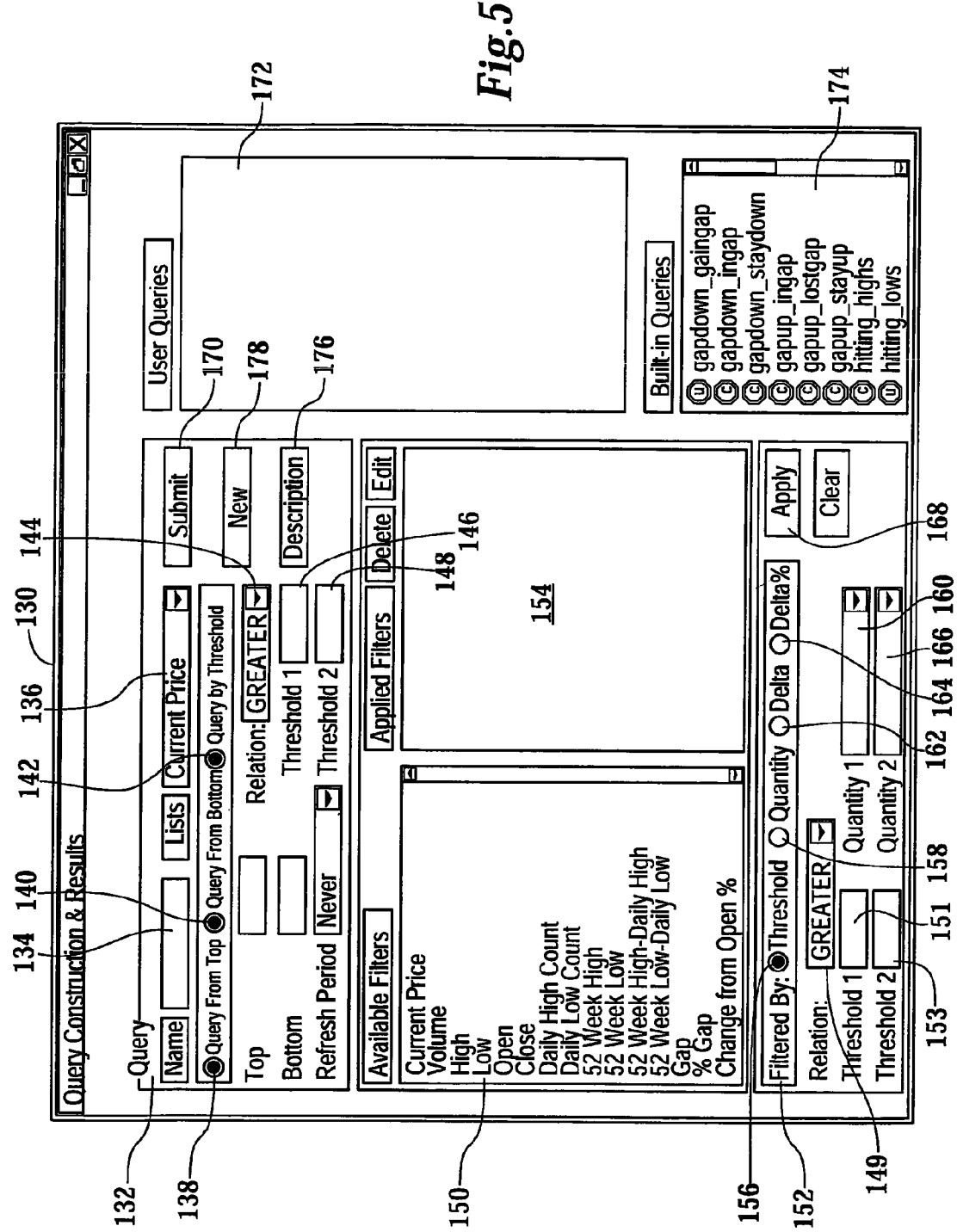
FIG. 5 is a graphical user interface for constructing queries of user specific criteria of a system for executing trades in user preferred securities of the present invention.

The user may construct new queries by pushing the Advanced button 124 in the Add query window 100. This will pull up a Query Construction & Results window 130 as seen in FIG. 5. In the Query Construction & Results window 130, the first step in creating a query is specifying in Query box 132, a criteria and a condition that securities must satisfy to be included in the query results. The user may then add more filters to further refine the query. For example, a user selects a name for the query in name box 134. Then, the user chooses the criteria to query from the pull-down-menu in List box 136. The user determines how to limit the query results by selecting the Query from Top button 138, which returns the top X securities sorted by the query criteria that meet the query and filter requirements, the Query from Bottom button 140 which returns the bottom X securities sorted by the query quantity that meet the query and filter requirements or the Query by Threshold button 142 which prompts the user to select a relationship in Relation box 144 (i.e. greater, between, etc.) and enter a number in the Threshold 1 box 146 and the Threshold 2 box 148 if BETWEEN is selected in Relation box 144.

To add additional criteria or filters to this query, the user selects a criteria in the Available Filter box 150 which is used in conjunction with various factors selected in the Filtered by box 152 which create the criteria in the Applied Filters box 154. After the user selects the desired criteria from Available Filter box 150, the user selects whether to filter by threshold, quantity, delta or delta percent in Filtered by box 152. If the user selects the Threshold button 156, the user then must also select a relationship in Relation box 149 (i.e. greater, between, etc.) and enter a number in the Threshold 1 box 151 and Threshold 2 field 153 if BETWEEN is selected in Relation box 149. For example, to set a filter that will only list securities with a greater than 15% change from open, the user chooses Change from Open (%) in the Available Filters box 150, GREATER in the Relation box 149 and 0.15 in Threshold 1 box 151.

Selecting the Quantity button 158, allows the user to compare an available filter quantity against another quantity using one of the relationship operators. For example, to set a filter that will only list stocks with a Volume greater than the one month average volume, the user chooses Volume in the Available Filters box 150, GREATER in the Relation box 149 and 1 Month Avg Volume in the Quantity 1 box 160.

Selecting the Delta button 162, allows the user to subtract the selection in the Quantity 1 box 160 from the originally selected criteria. If the difference falls within the Relation/Threshold entered by the user, the security will appear in the query results. For example, to set a filter that will only list stocks that are ⅛th or less off their 52-week high, the user chooses Current Price in the Available Filters box 150, 52-Week High in the Quantity 1 box 160, GREATER OR EQUAL in the Relation box 149, and −0.125 in Threshold 1 box 151.

Selecting the Delta % button 164, allows the user to subtract the selection made in the Quantity 1 box 160 from the originally selected criteria, then divide the result by the originally selected criteria. If the final result falls within the Relation/Threshold entered by the user, the security will appear in the query results. For example, to set a filter that will only list stocks within 2% above their 60 Day Simple Moving Average, the user chooses Current Price in the Available Filters box 150, 60-Day SMA in the Quantity 1 box 160, BETWEEN in the Relation box 149, 0 (zero) in Threshold 1 box 151, and 0.02 in Threshold 2 box 153.

Once the user has selected all of the desired filters, the user presses the Apply button 168 to add the filter to the query. When the user is finished building the entire query, the user presses the Submit button 170 which saves the query and sends it to decision support server 82 of server system 12. As explained above, the user may view the textual description of the selected query in the User Query list 172 or Built-in Query list 174 by pressing Description button 176. Another query may be created by pressing the New button 178.

Use of the above described built-in queries or user constructed queries allows the user to define the M user specific criteria and design a decision support tool that provides information to the user based upon the users trading style. Once the user has selected a particular query, the user pushes the add graph button 120 of FIG. 4 to generate a multi-dimensional graph for the user that graphically displays the user preferred securities.

Figure 6A:
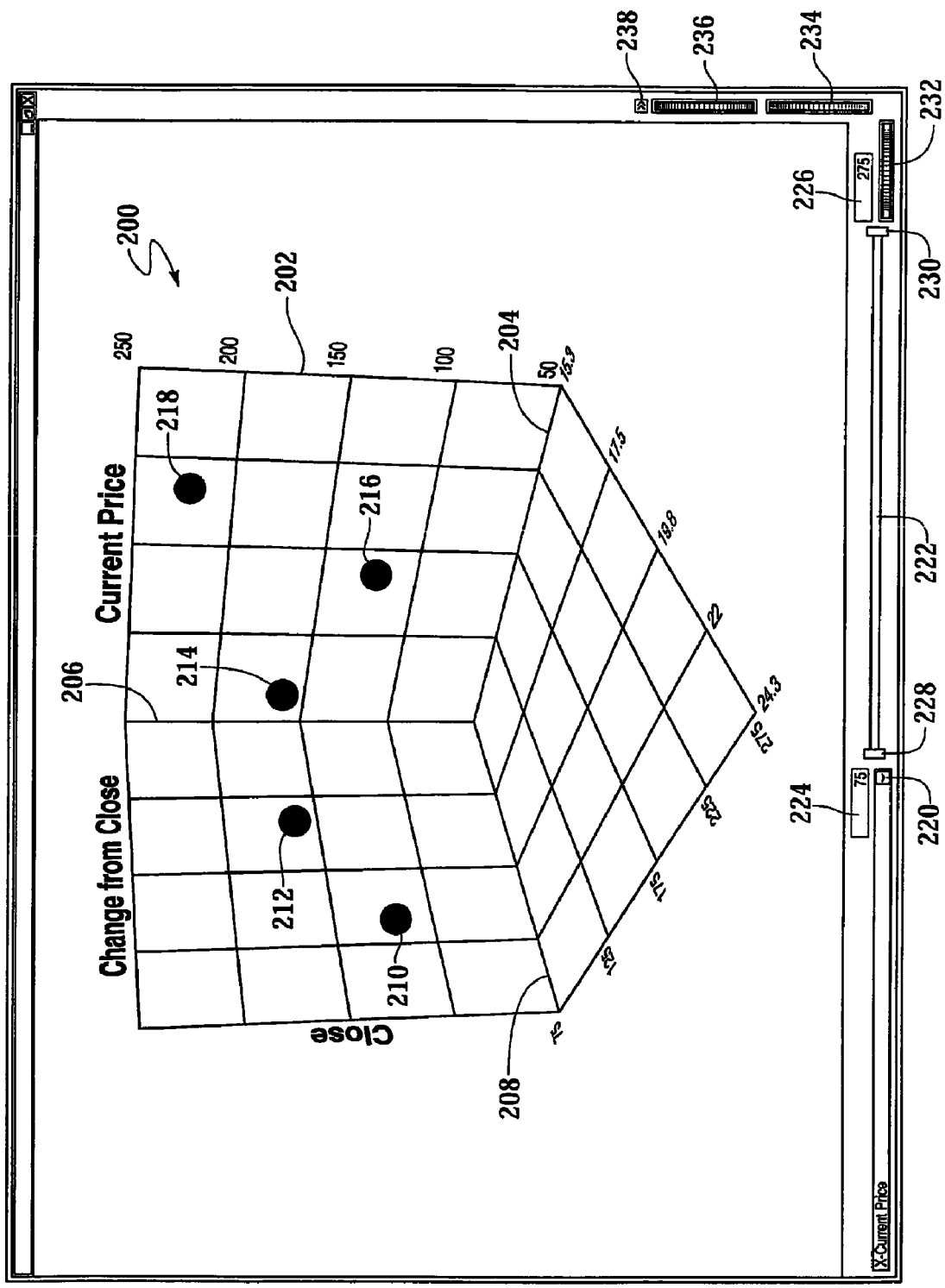
FIGS. 6A-6E are screen diagrams of multi-dimensional graphs for identifying user preferred securities of a system for executing trades in user preferred securities of the present invention.

As seen in FIG. 6A, a multi-dimensional graph 200 is depicted displaying the results of a user selected query. Graph 200 includes a coordinate system 202 that has an X-axis 204, a Y-axis 206, and a Z-axis 208. Displayed on graph 200 are a variety of icons which represent specific user preferred securities that were identified by decision support server 82 based upon the M user specific criteria in the user selected query. Specifically, five icons representing these user preferred securities are depicted as icon 210, icon 212, icon 214, icon 216 and icon 218.

In the illustrated embodiment, graph 200 is a three dimensional graph wherein the dimensions are represented by the three axes 204, 206, 208 of coordinate system 202. As will be explained in more detail below, the user selects the various parameters that are represented in graph 200. In the illustrated embodiment, the parameter represented by X-axis 204 is current price, the parameter represented by Y-axis 206 is the prior days' close price and the parameter represented by Z-axis 208 is the change in price from close.

Once graph 200 has been generated based upon the M user specific criteria in the user selected query, the user may further define the user preferred securities using various features of the graphical user interface of client system 14. For example, the user may select a particular parameter in the parameter box 220 then modify the display on graph 200 by manipulating slider bar system 222. In the illustrated embodiment, the user has selected the current price parameter in parameter box 220. The end points of the scale of X-axis 204 are displayed in box 224 and box 226. To change this scale, the user may operate sliders 228 and 230 to adjust the scale. For example, if the user is now only interested in securities having a current price greater than 100, the user would operate slider 228 to the right until 100 appeared in the box 224. This operation would hide any securities that are in graph 200 that have a current price less than 100.

Figure 7:
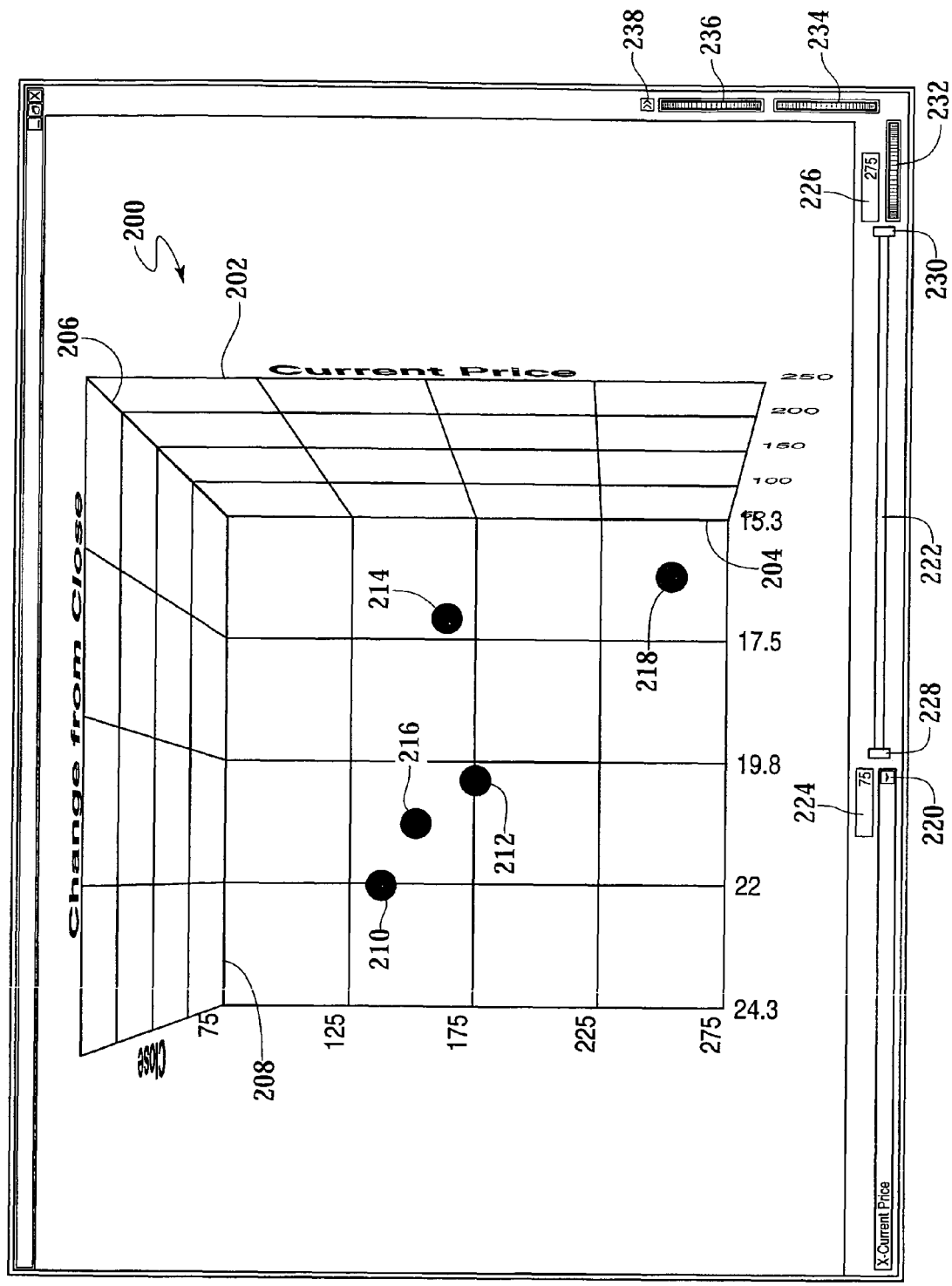
FIG. 7 is screen diagram of the three dimensional graph of FIG. 6A rotated for viewing the xz-plane.

The user may also manipulate the position of graph 200 in the graphical user interface by rotating wheels 232 and 234. For example, as best seen in FIG. 7, coordinates system 202 may be rotated such that the user has a direct view of the plane formed by X-axis 204 and Z-axis 208. This view allows the user to more precisely identify the current price and the change from close of the user preferred securities that are represented by icons 210-218. Referring again to FIG. 6A, the user of client system 14 may also change the size of graph 200 to more precisely view a particular area of graph 200 by rotating wheel 236.

Figure 8:
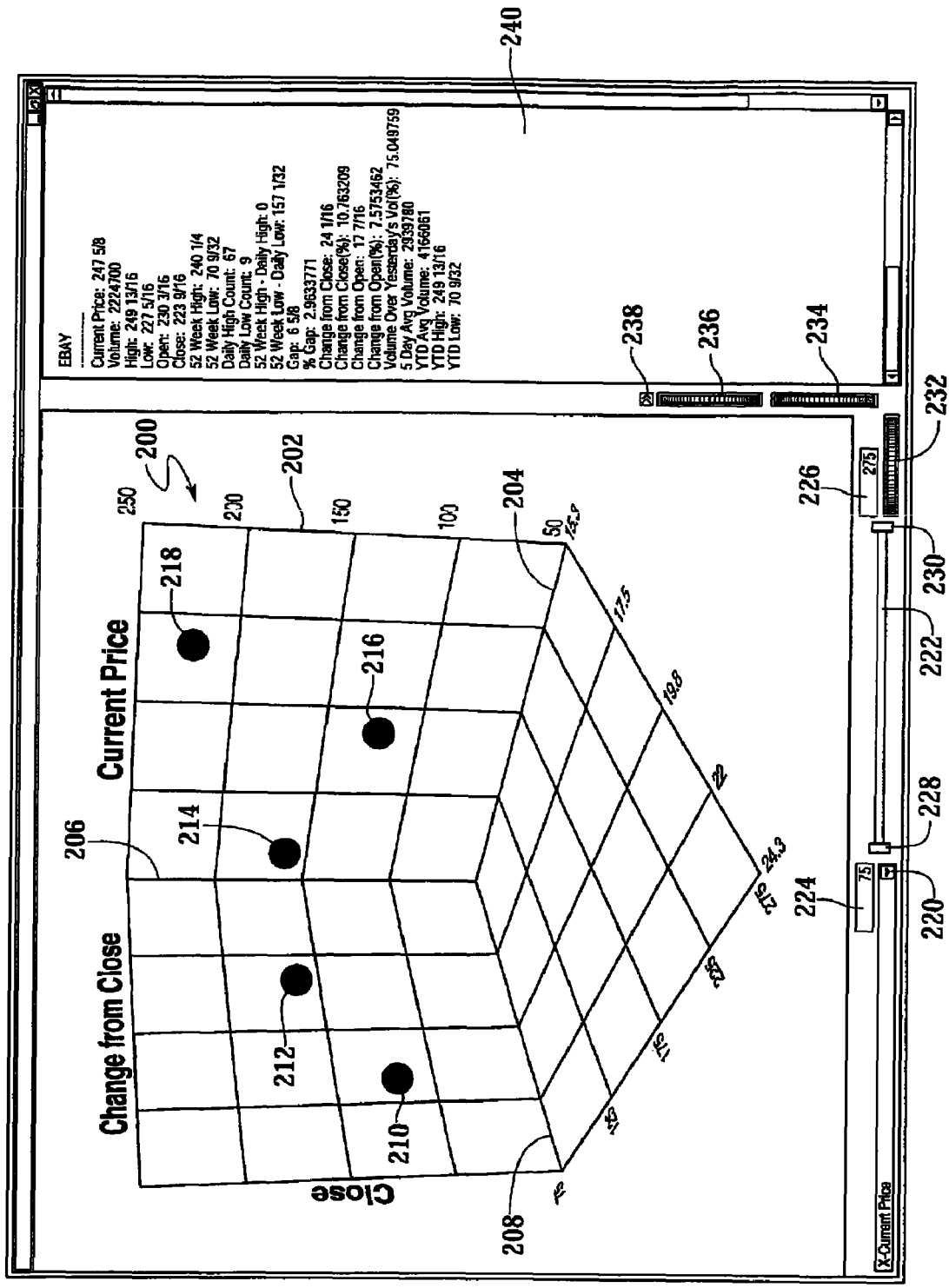
FIG. 8 is screen diagram of the three dimensional graph of FIG. 6A with a listing of criteria for a selected security.

If the user of client system 14 wants to know which security is represented by a particular icon and wants to view additional information about that particular security, the user may select that security and press button 238 to display, in list format, various criteria relating to the selected security. As best seen in FIG. 8, if icon 214 were selected and it represented ebay, the user would be able to view a plurality of criteria relating to ebay in a security list view window 240.

Figure 6B:
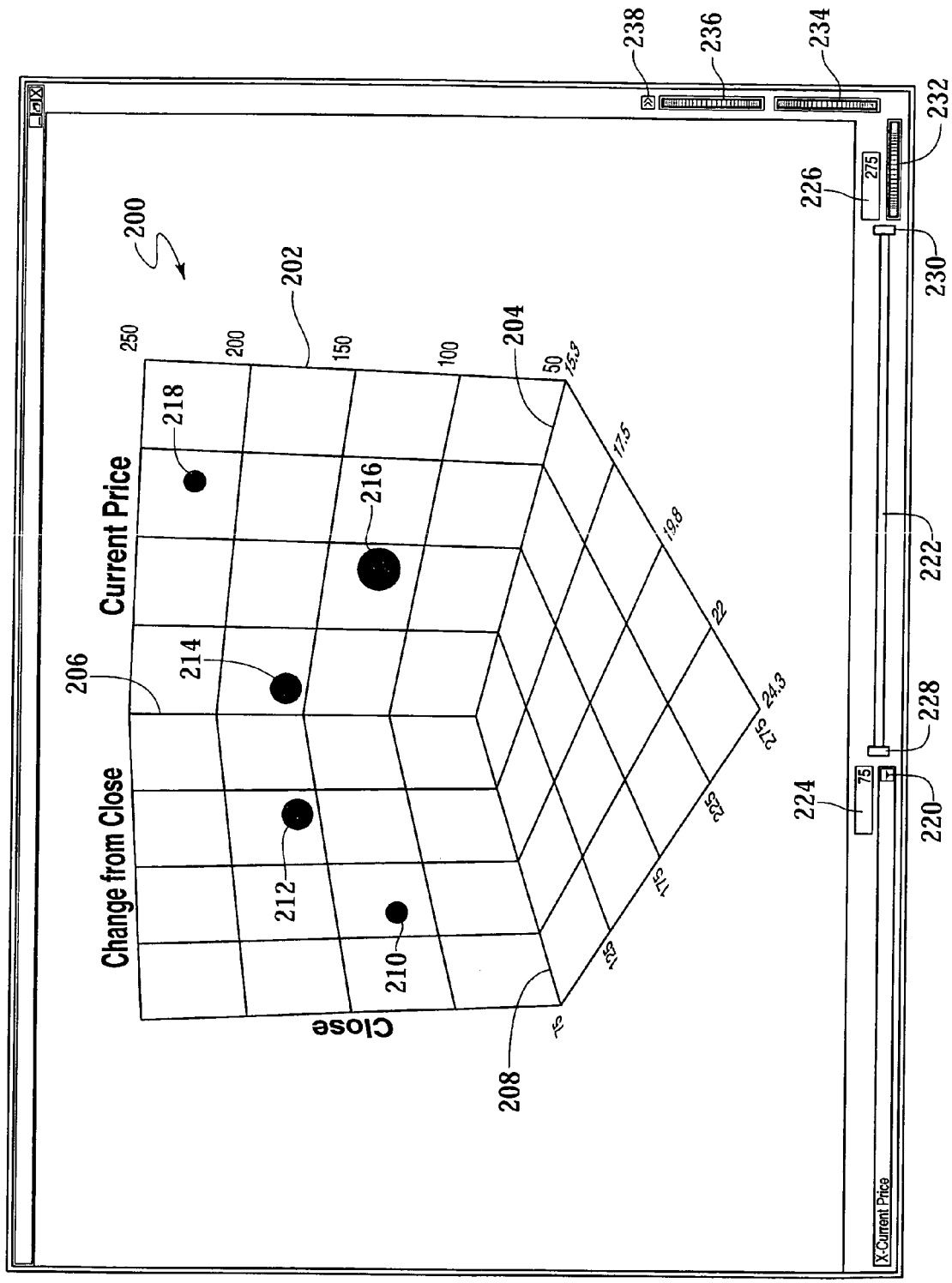

Referring now to FIG. 6B, therein is depicted a four dimensional graph 200 that graphically displays user preferred securities. As with graph 200 of FIG. 6A, graph 200 of FIG. 6B uses coordinate system 202 for displaying the three user selected parameters of current price, close and change from close. In addition, graph 200 of FIG. 6B also utilizes the size of the icons 210-218 to represent a fourth parameter which, in the illustrated embodiment, is volume. The relative size of the icons 210-218 compare the volumes of the user preferred securities displayed in graph 200. Specifically, the security represented by icon 210 and the security represented by icon 218 have a relatively low volume while the security represented by icon 216 has a relatively high volume. The security represented by icon 212 and the security represented by icon 214 have volumes that fall between that of the security represented by icon 210 and the security represented by icon 216.

Figure 6C:
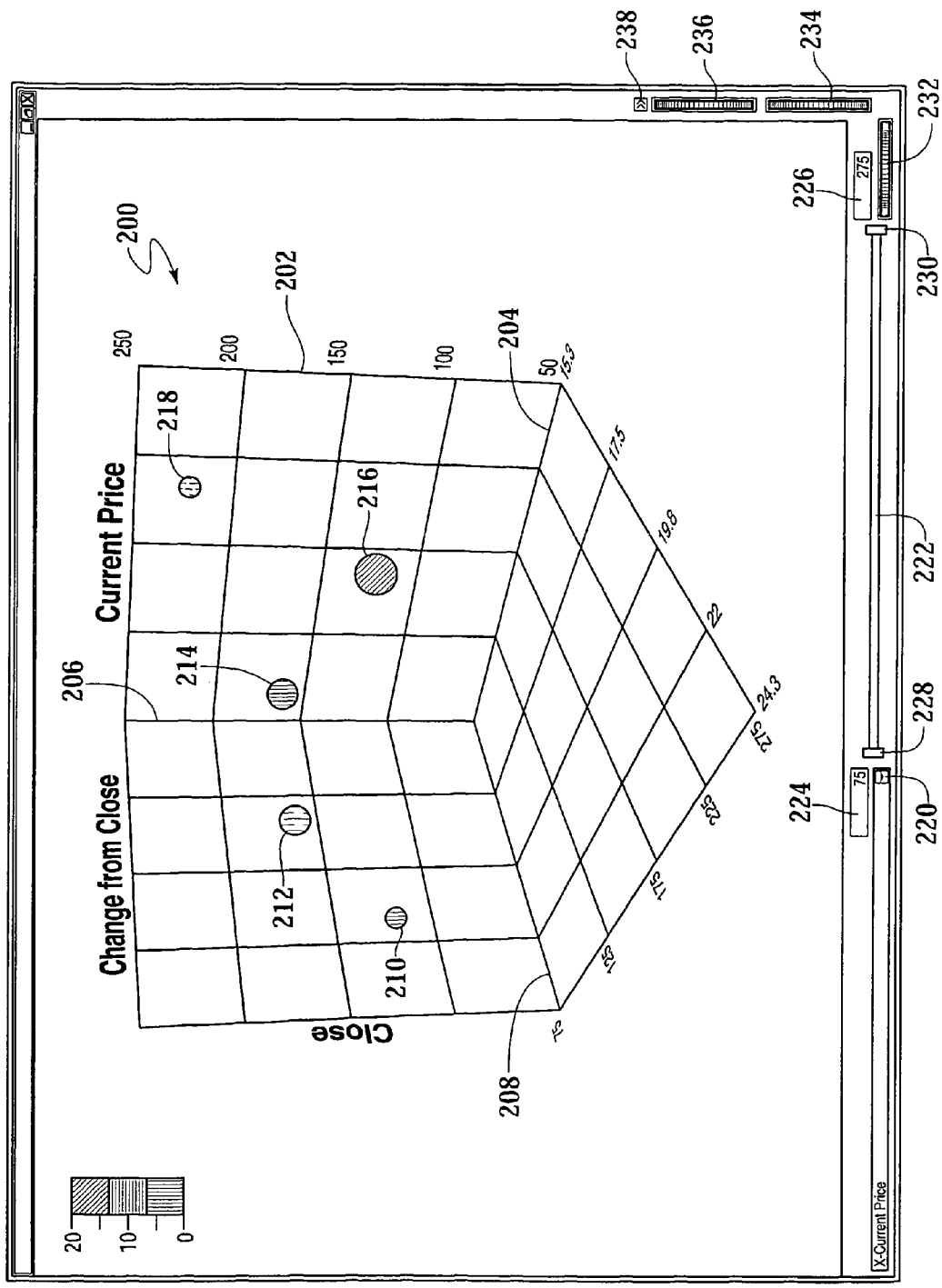

Referring next to FIG. 6C, therein is displayed a five dimensional graph 200. Graph 200 displays five user selected parameters which include current price on X-axis 204, close on Y-axis 206, change from close on Z-axis 208, volume based upon the size of icons 210-218 and change from open based upon the color of icons 210-218. In the illustrated example, the color spectrum, indicated by stippling, represents different percent changes from open ranging from zero to twenty percent.

Figure 6D:
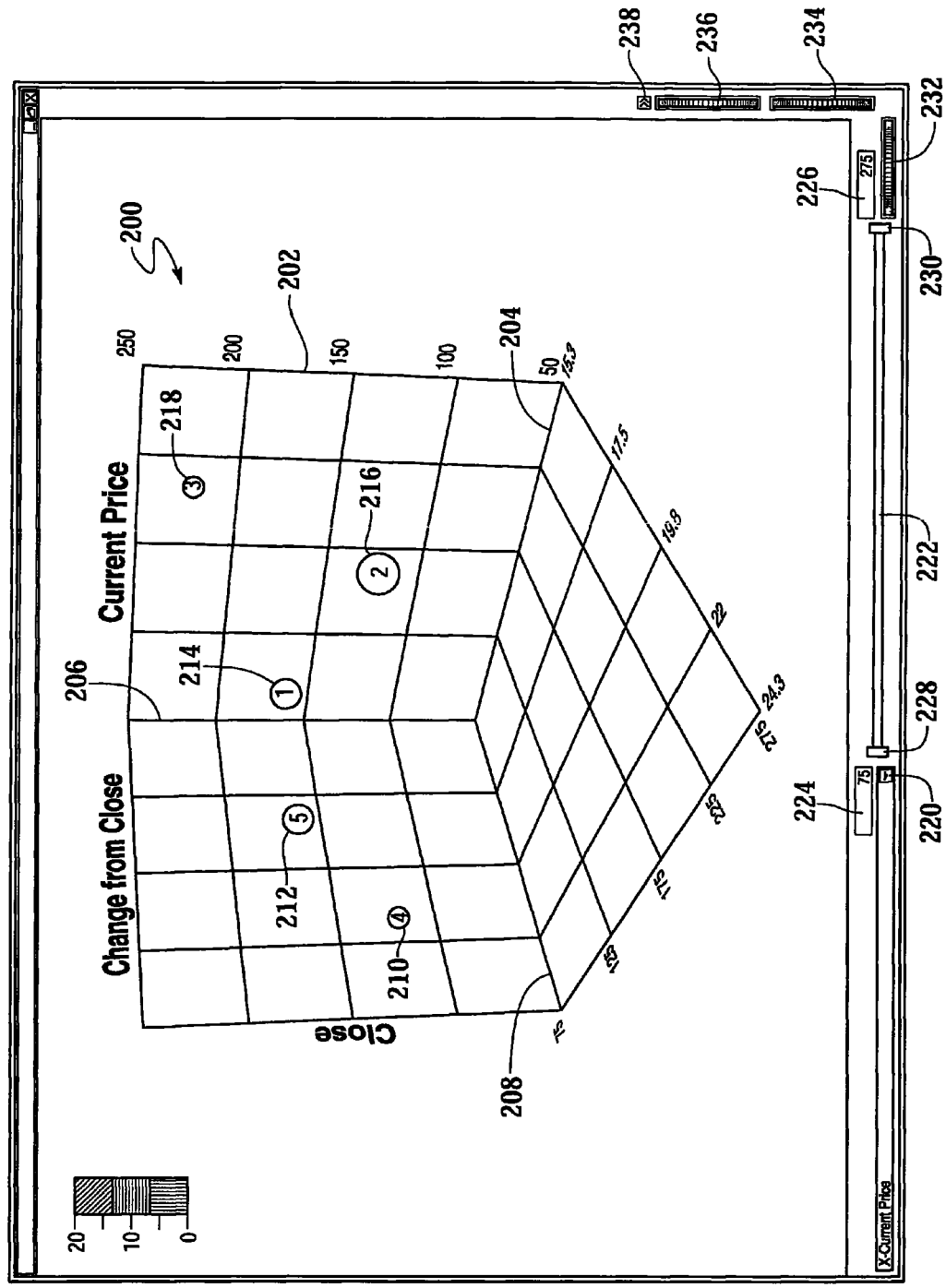

Referring now to FIG. 6D, therein is depicted a six dimensional graph 200 used to graphically display user preferred securities. In the illustrated embodiment, the six dimensions are represented by the three axis of the coordinates system 202, the size of icons 210-218, the color of icons 210-218 and the character symbology within icons 210-218. In this example, the six parameters represented on the six dimensional graph 200 are current price using X-axis 204, close using Y-axis 206, change from close using Z-axis 208, volume represented by the relative size of icons 210-218, percent change from open represented by the color of icons 210-218 and the relative market capitalization represented by the numerical character symbology within icons 210-218.

Figure 6E:
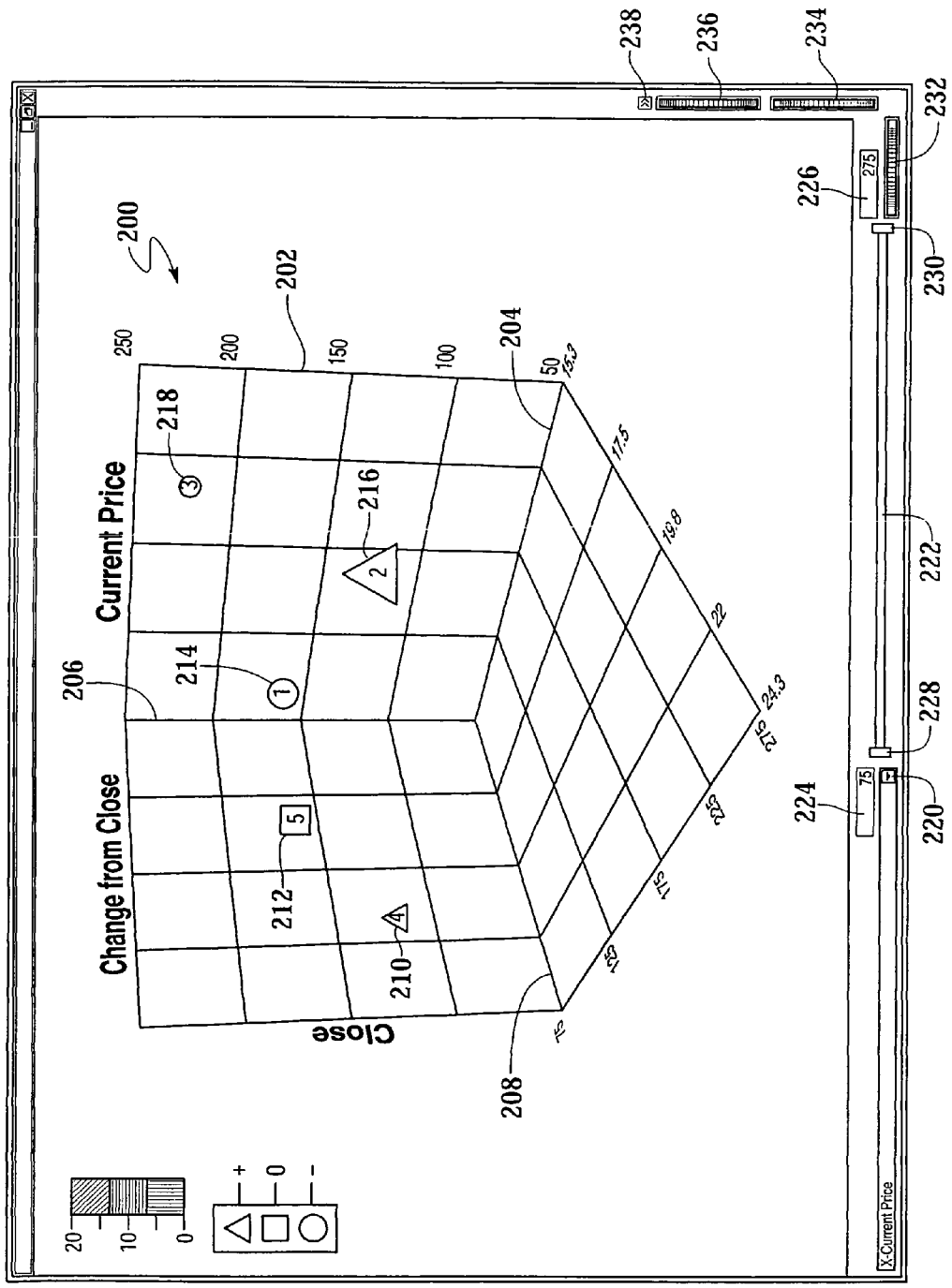

Referring now to FIG. 6E, therein is depicted a seven dimensional graph 200 for graphically displaying user preferred securities. Graph 200 allows the user to specify seven parameters for viewing the user preferred securities. Specifically, current price is represented on X-axis 204, close is represented Y-axis 206, change from close is represented on Z-axis 208, volume is represented by the size of icons 210-218, percent change from open is represented by the color of icons 210-218, rank order of market capitalization is represented by the numerical character symbology of icons 210-218 and relation to the five day simple moving average of the preferred securities is represented by the shape of icons 210-218. The triangles representing securities that are currently trading above the five day simple moving average, the circles represented by securities trading below the five day simple moving average and the square representing a security currently traded at its five day simply moving average.

Referring generally to FIGS. 6A-6E, the user of client system 14 views the user preferred securities that were identified based upon M user specific criteria that were sent to decision support server 82 for processing. The user preferred securities are placed on an N dimensional graph 200 based upon N user specific parameters. As should be apparent to those skilled in the art, the user may select any number of user specific criteria for identifying user preferred securities. Likewise, even though FIGS. 6A-6E have illustrated the use of between three and seven user specific parameters, the user of the present system could select any number of user specific parameters which could be displayed in multi-dimensional graphs having a larger number or a smaller number of dimensional characteristics. Additionally, it should be noted by those skilled in the art that the M user specific criteria used for selecting the user preferred securities may be the same as the N user specific parameters. Alternatively, however, the M user specific criteria and the N user specific parameters may have, some overlapping characteristics or no overlapping characteristics.

Figure 9:
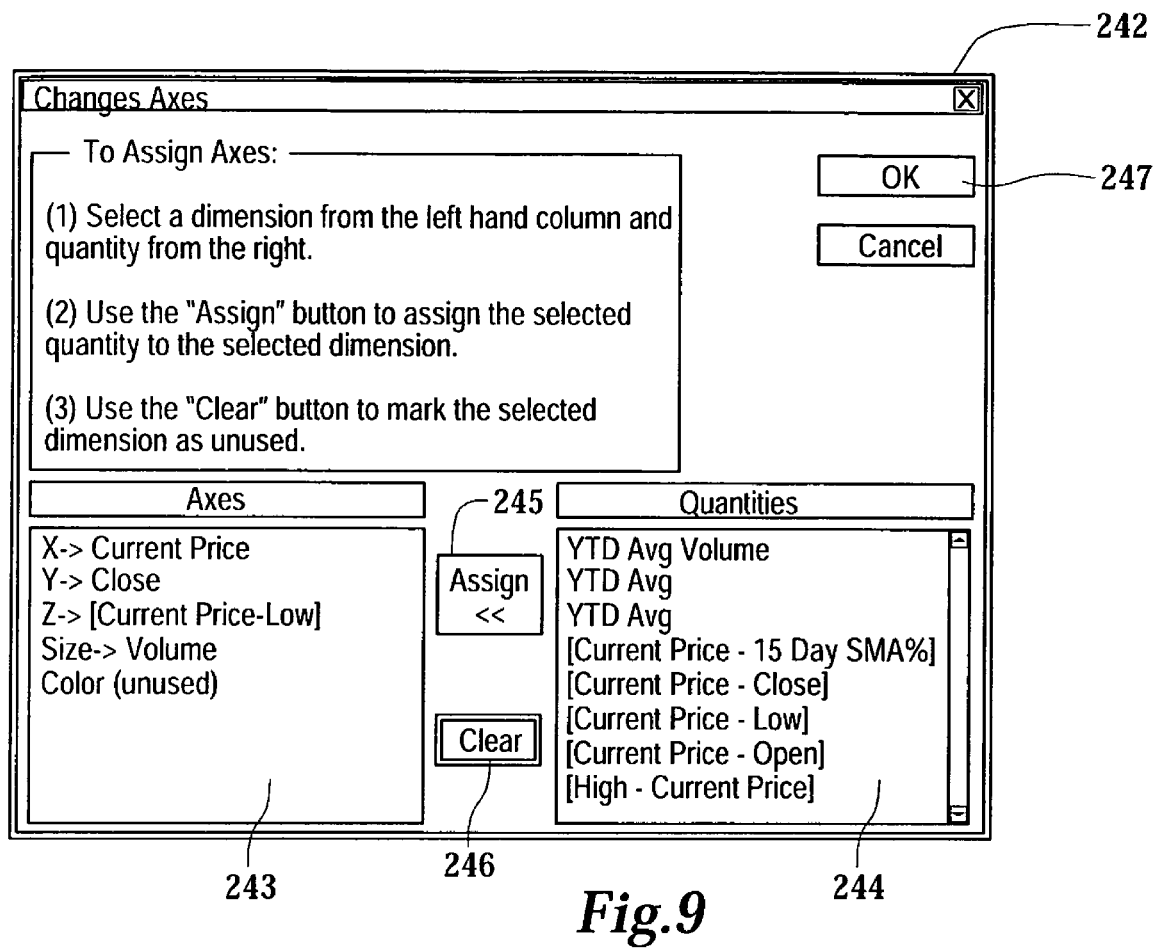
FIG. 9 is a graphical user interface for specifying user specific parameters for a system for executing trades in user preferred securities of the present invention.

Referring next to FIG. 9, therein is depicted a graphical user interface 242 that allows the user of client system 14 to change the parameters associated with the various dimensions on a graph 200. In the illustrated embodiment, five parameters are shown in Axes box 243. Specifically, in Axes box 243, the X-axis represents current price, the Y-axis represents close, the Z-axis represents current price-low, size represents volume and color has not been assigned a characteristic. The parameters are assigned based upon a pick list within Quantities box 244. To assign a characteristic to one of the parameters in Axes box 254, the user selects that parameter, for example color, and then selects a characteristic from Quantities box 244. Thereafter, the user pushes the Assign button 245 to assign that characteristic to a parameter. If the user wants to redesignate new characteristics to each of the parameters listed in Axes box 243, the user pushes the Clear button 246. Once the user has selected the desired characteristic for each of the parameters, the user pushes the Okay button 247 to view a graph 200 with those selected parameters.

Figure 10A:
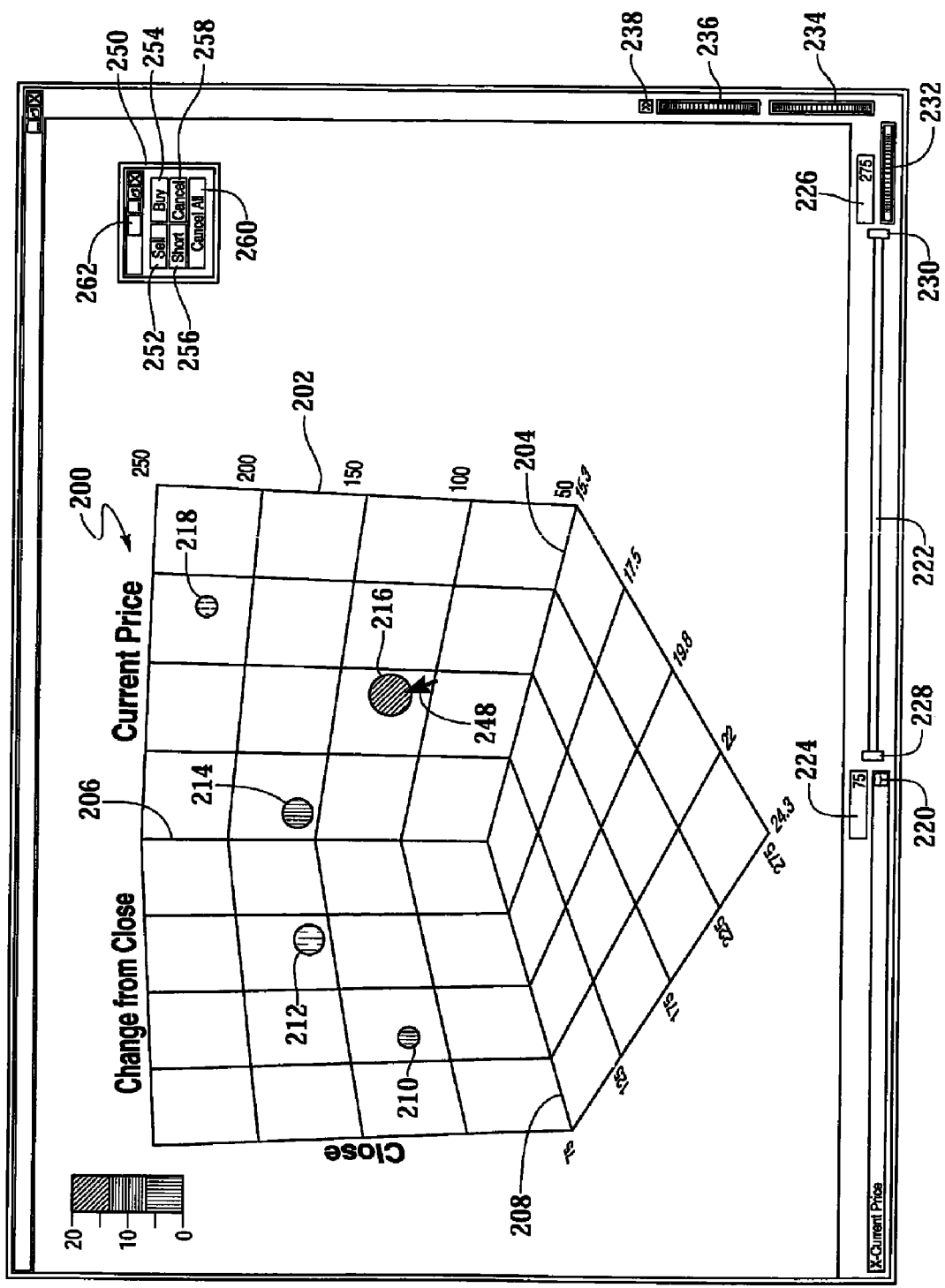

Referring next to FIG. 10A, therein is displayed a screen diagram including a five dimensional graph 200 and a graphical user interface for trade execution of the present invention. As described above with reference to FIG. 6C, graph 200 displays five user selected parameters which include current price on X-axis 204, close on Y-axis 206, change from close on Z-axis 208, volume based upon the size of icons 210-218 and change from open based upon the color of icons 210-218. In addition, execution box 250 is depicted in upper right hand corner of the screen diagram. Execution box 250 include a sell button 252, a buy button 254, a short button 256, a cancel button 258 and a cancel all button 260. Execution box 250 enables the user of client system 14 to send or cancel an order in the selected user preferred security. More specifically, when the user of client system 14 decides to make a trade, the user selects one of the user preferred securities displayed on graph 200 by, for example, pointing cursor 248 at the desired user preferred security and operating mouse 18, by operation of keyboard 16, by use of a touch screen on monitor 20 or other suitable input means. Once one of the user preferred securities displayed on graph 200 is selected, execution box 250 will appear on the screen of monitor 20, if not already displayed, and the selected user preferred security will be associated with execution box 250. At this point the user of client system 14 may buy shares in the selected user preferred security using buy button 254, sell shares in the selected user preferred security using sell button 252, assuming the user of client system 14 is long in the selected user preferred security, short shares in the selected user preferred security using short button 256, assuming the selected user preferred security has shortable shares or cancel a live order in the selected user preferred security using cancel button 258. In addition, the user of client system 14 may cancel all live orders in any security using cancel all button 260. As such, execution box 250 enables point and click execution of trades in the selected user preferred security. Alternatively, the user of client system 14 may execute trades using strokes on keyboard 16.

In this configuration, the user of execution box 250 must have preloaded order parameters associated with execution box 250 such that when a user preferred security is selected a trade may be ordered. For example, the number of share that the user of client system 14 wants to trade must be preloaded. In addition, the bid price of a buy order or the ask price of a sell or short order must be preloaded. Alternatively, the method for selecting the price must be established. For example, the user of client system 14 may select that the price associated with orders made from execution box 250 will be the price of the last trade, the inside ask or bid price or another user selected price level. Similarly, the user of client system 14 may preload an execution method. For example, the user may select a trade of a particular type such as a limit order or a market order. Likewise, the user may select a particular type of trade execution location 30 such as ECNs only or may select a specific trade execution location 30 such as Isld. Alternatively, the user of client system 14 may allow server system 12 select the trade execution location 30 for the orders initiated in execution box 250.

Figure 10B:
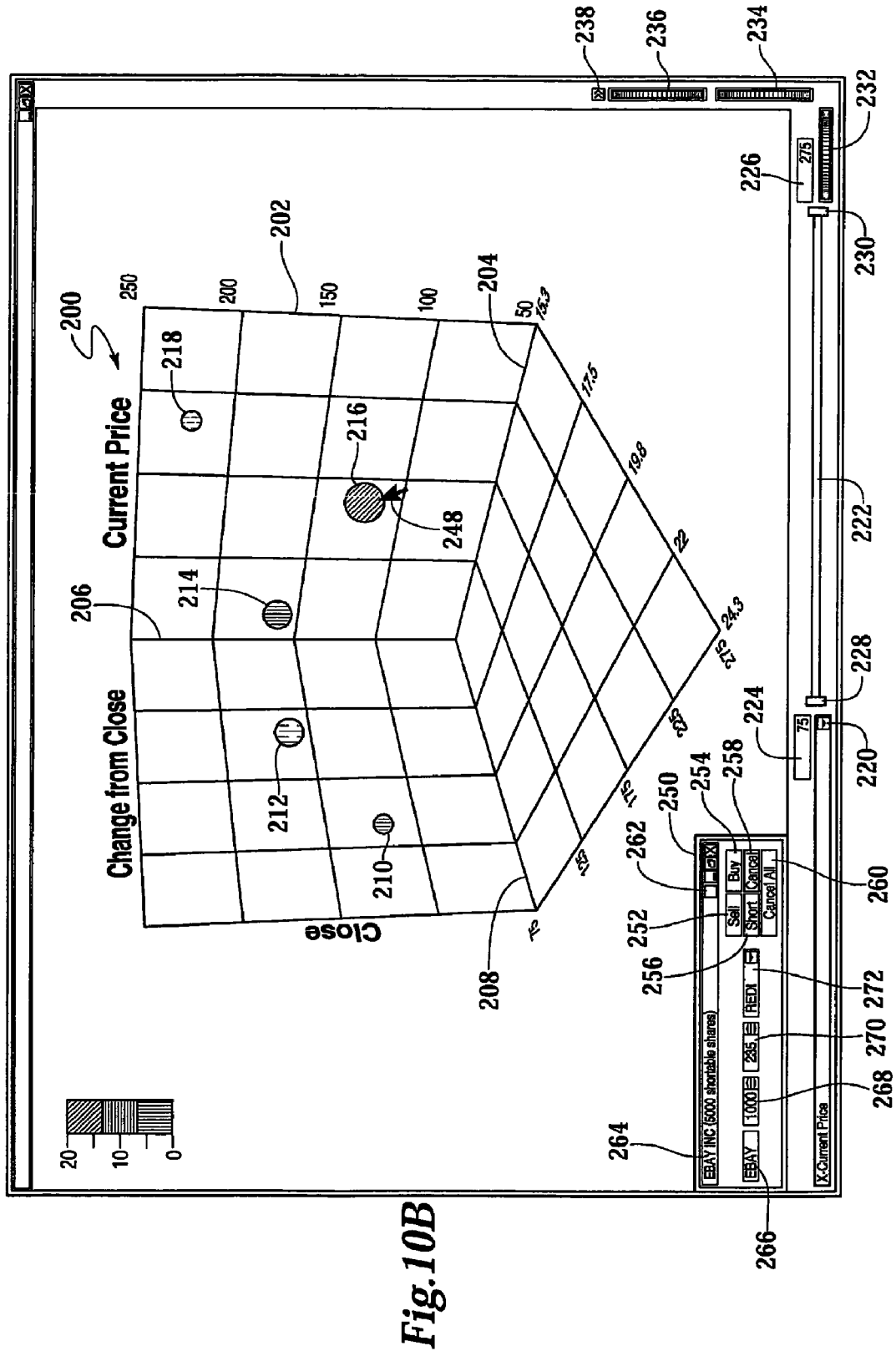

If the user of client system 14 wants to view and change the order parameters for each order, the user of client system 14 may use expansion button 262 of execution box 250 to see an expanded version of execution box 250, as best seen in the lower left hand corner of FIG. 10B. Expanded execution box 250 includes changeable fields for the above described order parameters. Specifically, execution box 250 includes an identification field 264 that lists the name of the company and the number of shortable shares available, security symbol field 266, number of shares field 268, price field 270 and execution method field 272. These field are populated when the user of client system 14 selects one of the user preferred securities. Use of expanded execution box 250 allows the user of client system 14 to easily see and modify the number of share, the price and the execution method associated with an order. Use of execution box 250 in either of its configurations allows the user of client system 14 to quickly load one of the user preferred securities and send an order requesting that a trade in that security be executed.

Figure 10C:
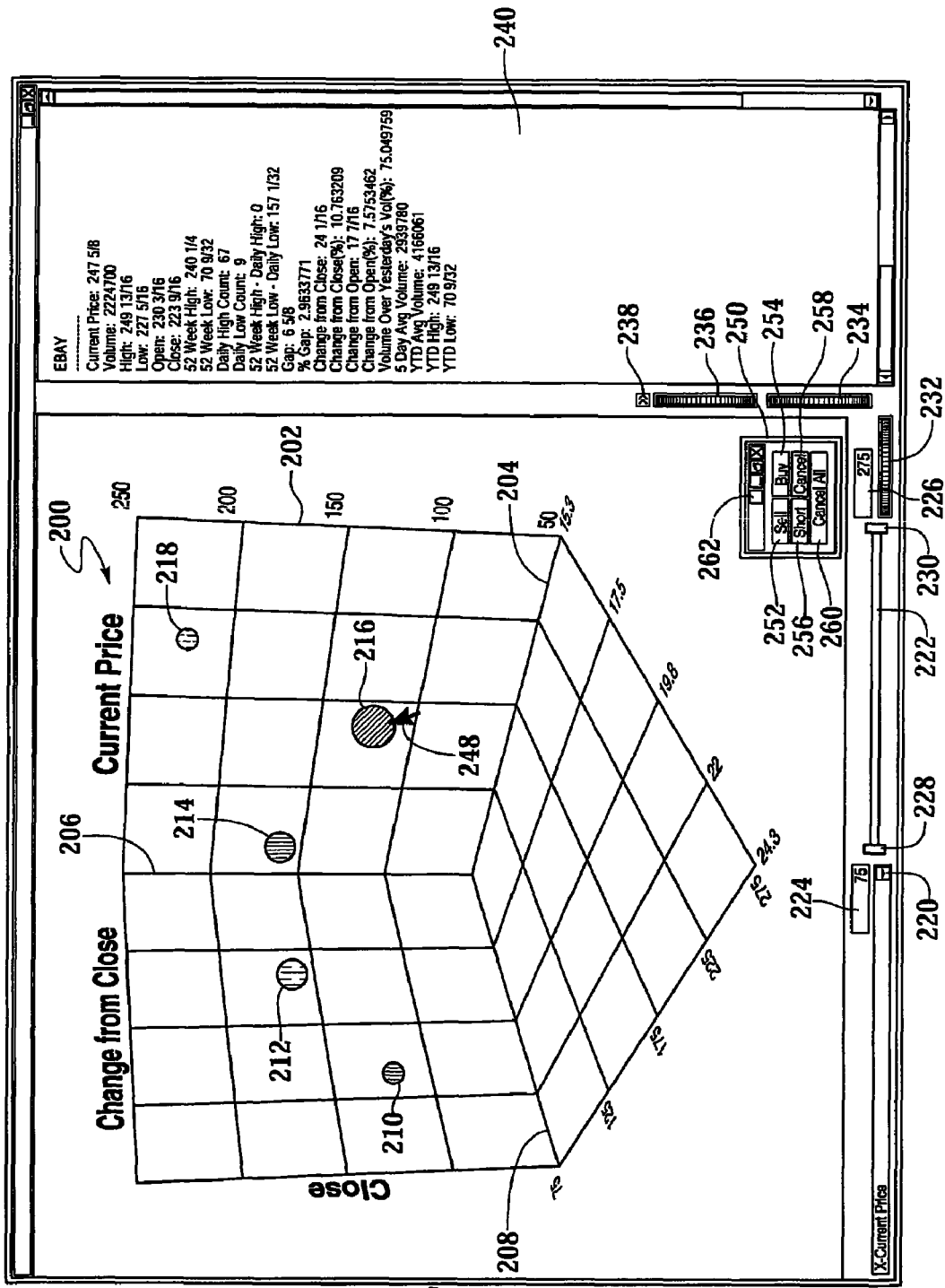

If the user of client system 14 want more information regarding the selected user preferred security prior to placing an order, the user may view security list view window 240 in conjunction with execution box 250, as best seen in FIG. 10C. Use of execution box 250 in conjunction with security list view window 240 allows the user of client system 14 to quickly load one of the user preferred securities, perform additional analysis on criteria associated with the selected user preferred security and then send an order requesting that a trade in that security be executed.

Figure 10D:
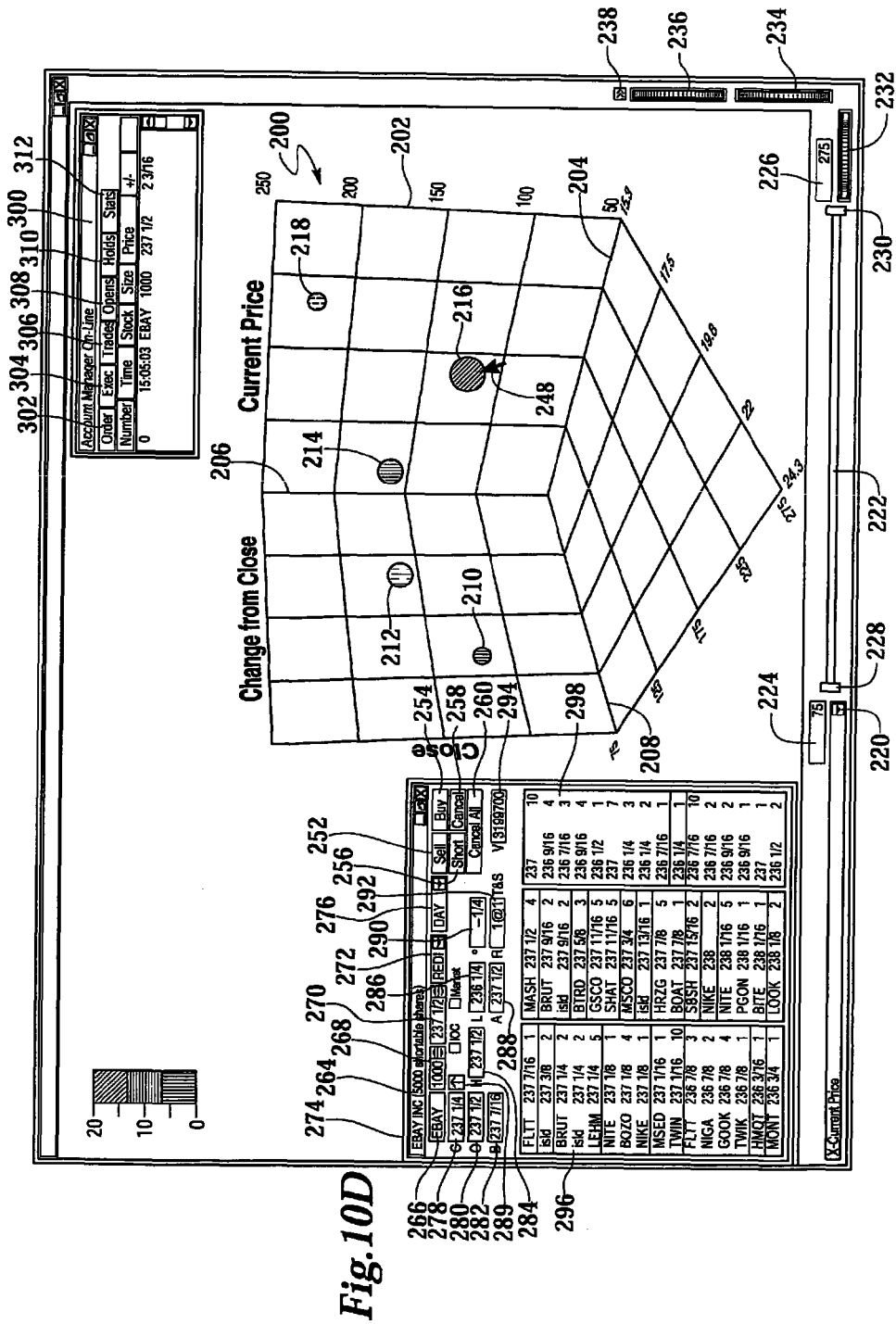

In FIG. 10D, another embodiment of the system for executing trades in user preferred securities of the present invention is depicted. The illustrated embodiment includes a five dimensional graph 200 and a stock box 274 which provides information relating to the selected user preferred security to the user of client system 14 and is a graphical user interface for trade execution similar to execution box 250. More specifically, as with execution box 250, stock box 274 includes a sell button 252, a buy button 254, a short button 256, a cancel button 258 and a cancel all button 260. Also like execution box 250 in the expanded format, stock box 274 includes an identification field 264 that lists the name of the company and the number of shortable shares available, security symbol field 266, number of shares field 268, price field 270 and execution method field 272. Each of these buttons and fields operate and are used in the manner described above. In addition to these buttons and fields, stock box 274 includes a variables field 276 that has various parameters depending upon the execution method that is selected by the user, a close field 278 that displays the price at yesterday's close, an open field 280 that displays the price at today's open, a current bid price field 282, a high for the day field 284, a low for the day field 286, a current ask price field 288, a tick direction field 289, a change on the day field 290, a ratio field 292 that displays the ratio of market participants at the inside bid vs. the inside ask and a volume field 294.

Stock box 274 includes a level II data window 296 that displays the market participant symbol, the price and the shares available. Stock box 274 also includes a time & sales window 298 that displays all trades in real time. The level II data window 296 is populated with data from server system 12 when the user of client system 14 selects one of the user preferred securities. Having this level II information assists the user of client system 14 in making decisions regarding the execution of a trade in the selected user preferred security. For example, this level II information may assist the user of client system 14 in selecting an execution method for a trade. Specifically, the user of client system 14 can load order parameters into price field 270 and execution method field 272 by selecting one of the market participants and price levels listed in level II data window 296. The user of client system 14 may then send an order base upon those order parameter.

The illustrated embodiment also includes an account manager window 300. Account manager window 300 tracks all trades, open orders, positions and the profit and loss of the user of client system 14. Account manager window 300 provides six separate types of information and automatically switches between the different features to make sure the user of client system 14 has the most relevant information. In addition, each feature is accessible by selecting the tab associated therewith. Specifically, account manager window 300 includes an order tab 302, which prompts the display of all of the orders that the user of client system 14 has placed that day, an executions tab 304 that prompts the display of all the orders that were executed by the user of client system 14 during that day, a trades tab 306 that prompts the display of all trades with profit and loss, an open trades tab 308 that prompts the display of the current open positions of the user of client system 14, a holds tab 310 that prompts the display of any long-term position held by the user of client system 14 and a stats tab 312 that prompts the display of the user's vital account information such as real-time buying power.

Referring now to FIG. 10E, therein is depicted a graphical user interface 320 that may be viewed on monitor 20 of client system 14. This graphical user interface includes graph 322, graph 324, graph 326, graph 328 and graph 330. Each of these graphs represent a particular trading strategy that the user of client system 14 selects. In this view, the user of client system 14 may select any one of the user preferred securities represented by any one of the icons on any one of the graphs 322-330. When the user selects the desired user preferred security, real-time information relating to that security is loaded into stock box 274 as explained above.

As such, the system for executing trades in user preferred securities of the present invention allows the user to operate multiple trading models using multiple N dimensional graphs such that a tremendous amount of information is available to the user in an understandable format. Specifically, in the illustrated embodiment, twenty-five user preferred securities have been identified based upon five different trading models each of which has its own M user specific criteria associated therewith. In addition, the user may select N number of parameters in each graph for displaying the user preferred securities identified in each trading model. As explained above, an order for any one of these twenty-five user preferred securities can be placed and a trade executed on that order substantially in real-time using the system for executing trades in user preferred securities of the present invention.

While FIG. 10E has been described as having five graphs 322-330 each having five user preferred securities displayed thereon, it should be understood by those skilled in the art that the number of graphs as well as the number of user preferred securities in each graph may be changed and is selected based upon user preference. As such, the user may receive as much information as the user believes is helpful in identifying which securities to trade. In addition, it should be understood by those skilled in the art that even though FIG. 10E has depicted a single stock box 274, one or more execution boxes 250 could alternatively be used in conjunction with multiple graphs such as graphs 322-330. For example, a single execution box 250 may be used for numerous graph or a unique execution box 250 may be used with each graph depending upon user preference. As such, the user of client system 14 may have access to information relating to numerous user preferred securities in numerous trading models and may quickly execute a trade in any one of the user preferred securities using the system for executing trades in user preferred securities of the present invention.

Figure 11:
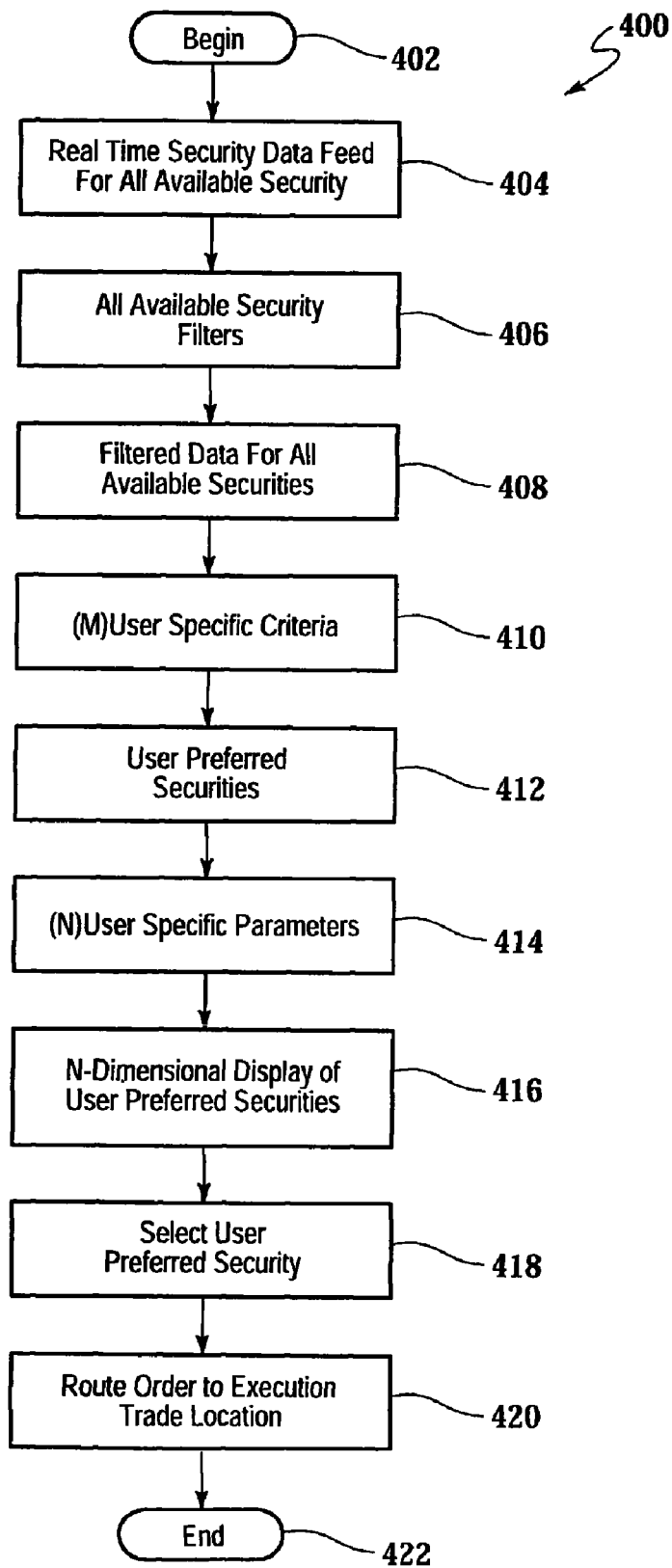
FIG. 11 is a flow diagram of a method for executing trades in user preferred securities of the present invention.

Referring now to FIG. 11, and with reference to FIG. 1, therein is depicted a flow diagram of a method for executing trades in user preferred securities of the present invention. The method 400 begins at step 402. In step 404, real-time security data is provided from a security data source 26 to server system 12. Server system 12 processes the security data feed using all available filters in step 406 to generate filtered data for all available securities in step 408. In step 410, the user provides M user specific criteria to the server system 12 from a client system 14 such that the server system 12 may identify the securities that meet the M user specific criteria, i.e., user preferred securities, in step 412. In step 414, the user provides N user specific parameters to the client system 14 which are used in step 416 to create an N dimensional graph that is populated by icons representing the user preferred securities. In step 418 the user selects one of the user preferred securities and sends an order from client system 14 to server system 12 where the order is routed to a trade execution location 30 in step 420. The process ends at step 422. As such, the computer method and system for executing trades in user preferred securities of the present invention provides the user with a decision support tool that allows the user to identify securities of interest and execute trades in those securities.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A computer readable medium having a sequence of instructions which, when executed by a processing entity, effectuates a trade in a user selected user preferred security, the computer readable medium comprising:
   a code segment for identifying user preferred securities from a plurality of securities based upon at least two user specific criteria including at least one criterion related to pricing;
   a code segment for generating a graph in which each of the user preferred securities is represented and graphically differentiated from each of the other user preferred securities based upon the values of at least three user specific parameters associated with each of the user preferred securities;

a code segment for receiving a user selection of one of the user preferred securities represented on the graph;

a code segment for associating order parameters with the user selected user preferred security; and a code segment for sending an order to execute a trade in the user selected user preferred security according to the order parameters.

2. The computer readable medium as recited in claim 1 wherein the at least one criterion related to pricing is one of: Current Price, High/Low, Open/Close, Daily High/Low Count, 52 Week High/Low, Gap, Change from Close/Open, Change from X Day/Month/YTD Avg Close, X Day/Month/YTD High/Low, 15/60/120 Day SMA, 15/60/120 Day EMA, Rate of Change, 10/30/50 Day RSI, 10/30/50 Day RSI from Close, Bollinger Bands, MACD, 20/40/60 Day Momentum, 20/40/60 Day Momentum from Close, Money Flow, Money Flow (%), Williams % R, PE Ratio, and Market Cap.

3. The computer readable medium as recited in claim 1 wherein the code segment for associating order parameters with the selected user preferred security further comprises a code segment for associating a number of shares, a price and an execution location with the user selected user preferred security.

4. The computer readable medium as recited in claim 1 further comprising a code segment for preloading the order parameters prior to receiving the user selection of one of the user preferred securities represented on the graph.

5. The computer readable medium as recited in claim 1 wherein the code segment for sending an order to execute a trade in the user selected user preferred security further comprises a code segment for sending an order selected from the group comprising a buy order, a sell order, a short order and a cancel order.

6. The computer readable medium as recited in claim 1 further comprising a code segment for performing compliance analysis on the order.

7. The computer readable medium as recited in claim 1 further comprising a code segment for storing information relating to the order in a database.

8. The computer readable medium as recited in claim 1 further comprising a code segment for receiving a continuously updated stream of security data, including level one, level two and time and sales data, relating to the plurality of securities.

9. The computer readable medium as recited in claim 1 further comprising a code segment for receiving a continuously updated stream of security data, including at least one of fundamental data and analytical data, relating to the plurality of securities.

10. The computer readable medium as recited in claim 1 wherein code segment for generating a graph comprises a code segment for displaying a three dimensional coordinate system having mutually perpendicular axes intersecting at a common origin and representing the user preferred securities as visually distinct graphical icons located within the coordinate system at positions representative of the values of each of the user preferred securities.

11. The computer readable medium as recited in claim 10 wherein the code segment for generating a graph further comprises a code segment for altering characteristics of the visually distinct graphical icons to represent dimensions greater than 3.

12. The computer readable medium as recited in claim 1 wherein each of the user specific criteria is different from each of the user specific parameters.

13. The computer readable medium as recited in claim 1 wherein the user specific criteria and the user specific parameters are the same.

14. The computer readable medium as recited in claim 1 wherein at least one of the user specific criteria is different from any of the user specific parameters.

15. The computer readable medium as recited in claim 1 wherein at least one of the user specific criteria is the same as one of the user specific parameters.

16. A computer readable medium having a sequence of instructions which when executed by a processing entity, effectuates a trade in a user selected user preferred security, the computer readable medium comprising:

a code segment for receiving security data for a plurality of securities from a security data source;

a code segment for receiving from a user at least two user specific criteria including at least one criterion related to pricing;

a code segment for automatically identifying within the plurality of securities at least two user preferred securities conforming to the user specific criteria received from the user;

a code segment for receiving at least first, second and third user specific parameters from the user;

a code segment for generating a graph having first, second and third mutually-orthogonal axes intersecting at a common origin;

a code segment for plotting each of the user preferred securities as an icon on the graph at a coordinate corresponding to the value of the first parameter of that user preferred security along the first axis, corresponding to the value of the second parameter of that user preferred security along the second axis and corresponding to the value of the third parameter of that user preferred security along the third axis, thereby representing and graphically differentiating the user preferred securities from one another;

a code segment for receiving a user selection of one of the user preferred securities represented on the graph;

a code segment for associating order parameters with the user selected user preferred security; and a code segment for sending an order to execute a trade in the user selected user preferred security according to the order parameters.

17. A system for enabling a trade in a user selected user preferred security, the system comprising:

means for identifying user preferred securities from a plurality of securities based upon at least two user specific criteria including at least one criterion related to pricing;

means for generating a graph in which each of the user preferred securities is represented and graphically differentiated from each of the other user preferred securities based upon the values of at least three user specific parameters associated with each of the user preferred securities;

means for receiving a user selection of one of the user preferred securities represented on the graph;

means for associating order parameters with the user selected user preferred security; and means for sending an order to execute a trade in the user selected user preferred security according to the order parameters.

18. The system as recited in claim 17 wherein the at least one criterion related to pricing is one of: Current Price, High/

Low, Open/Close, Daily High/Low Count, 52 Week High/Low, Gap, Change from Close/Open, Change from X Day/Month/YTD Avg Close, X Day/Month/YTD High/Low, 15/60/120 Day SMA, 15/60/120 Day EMA, Rate of Change, 10/30/50 Day RSI, 10/30/50 Day RSI from Close, Bollinger sands, MACD, 20/40/60 Day Momentum, 20/40/60 Day Momentum from Close, Money Flow, Money Flow (%), Williams % R, PE Ratio, and Market Cap.

19. The system as recited in claim 17 wherein the means for associating order parameters with the selected user preferred security further comprises means for associating a number of shares, a price and an execution location with the user selected user preferred security.

20. The system as recited in claim 17 further comprising means for preloading the order parameters prior to the selection of one of the user preferred securities represented on the graph.

21. The system as recited in claim 17 wherein the means for sending an order to execute a trade in the user selected user preferred security further comprises means for sending an order selected from the group comprising a buy order, a sell order, a short order and a cancel order.

22. The system as recited in claim 17 further comprising means for performing compliance analysis on the order.

23. The system as recited in claim 17 further comprising means for storing information relating to the order in a database.

24. The system as recited in claim 17 further comprising means for receiving a continuously updated stream of security data, including level one, level two and time and sales data, relating to the plurality of securities.

25. The system as recited in claim 17 further comprising means for receiving a continuously updated stream of security data, including at least one of fundamental data and analytical data, relating to the plurality of securities.

26. The system as recited in claim 17 wherein means for generating a graph comprises means for displaying a three dimensional coordinate system having mutually perpendicular axes intersecting at a common origin and representing the user preferred securities as visually distinct graphical icons located within the coordinate system at positions representative of the values of each of the user preferred securities.

27. The system as recited in claim 26 wherein the means for generating a graph further comprises means for altering characteristics of the visually distinct graphical icons to represent dimensions greater than 3.

28. The system as recited in claim 17 wherein each of the user specific criteria is different from each of the user specific parameters.

29. The system as recited in claim 17 wherein the user specific criteria and the user specific parameters are the same.

30. The system as recited in claim 17 wherein at least one of the user specific criteria is different from any of the user specific parameters.

31. The system as recited in claim 17 wherein at least one of the user specific criteria is the same as one of the user specific parameters.

32. A system for enabling a trade in a user selected user preferred security, the system comprising:
    means for receiving security data for a plurality of securities from a security data source;
    means for receiving from a user at least two user specific criteria including at least one criterion related to pricing;
    means for automatically identifying within the plurality of securities at least two user preferred securities conforming to the user specific criteria received from the user;
    means for receiving at least first, second and third user specific parameters from the user;
    means for generating a graph having first, second and third mutually-orthogonal axes intersecting at a common origin;
    means for plotting each of the user preferred securities as an icon on the graph at a coordinate corresponding to the value of the first parameter of that user preferred security along the first axis, corresponding to the value of the second parameter of that user preferred security along the second axis and corresponding to the value of the third parameter of that user preferred security along the third axis, thereby representing and graphically differentiating the user preferred securities from one another;
    means for receiving a user selection of one of the user preferred securities represented on the graph;
    means for associating order parameters with the user selected user preferred security; and
    means for sending an order to execute a trade in the user selected user preferred security according to the order parameters.

* * * * *

UNITED STATES PATENT AND TRADEMARK OFFICE
CERTIFICATE OF CORRECTION

| | | |
|---|---|---|
| PATENT NO. | : 7,962,398 B1 | Page 1 of 1 |
| APPLICATION NO. | : 09/663151 | |
| DATED | : June 14, 2011 | |
| INVENTOR(S) | : Bradley J. Swearingen et al. | |

It is certified that error appears in the above-identified patent and that said Letters Patent is hereby corrected as shown below:

In Claim 18, Column 19, Line 6:

Delete "sands"

and replace it with --Bands--

Signed and Sealed this
Twenty-fifth Day of October, 2011

David J. Kappos
*Director of the United States Patent and Trademark Office*